(12) United States Patent
Mitsuda et al.

(10) Patent No.: US 11,967,863 B2
(45) Date of Patent: Apr. 23, 2024

(54) ROTATING ELECTRIC MACHINE

(71) Applicant: Mitsubishi Electric Corporation, Tokyo (JP)

(72) Inventors: Hiroshi Mitsuda, Tokyo (JP); Yoshihiro Miyama, Tokyo (JP); Moriyuki Hazeyama, Tokyo (JP); Masaya Inoue, Tokyo (JP); Masashi Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 258 days.

(21) Appl. No.: 17/767,059

(22) PCT Filed: Nov. 13, 2019

(86) PCT No.: PCT/JP2019/044561
§ 371 (c)(1),
(2) Date: Apr. 7, 2022

(87) PCT Pub. No.: WO2021/095167
PCT Pub. Date: May 20, 2021

(65) Prior Publication Data
US 2022/0385124 A1 Dec. 1, 2022

(51) Int. Cl.
*H02K 1/2706* (2022.01)

(52) U.S. Cl.
CPC ................. *H02K 1/2706* (2013.01)

(58) Field of Classification Search
CPC .... H02K 1/2706; H02K 21/14; H02K 1/2766; Y02T 10/64

(Continued)

(56) References Cited

U.S. PATENT DOCUMENTS 11,894,726 B2* 2/2024 Kitao ................. H02K 21/16
2011/0163624 A1* 7/2011 Hori ................... H02K 1/2766
310/156.53

(Continued)

FOREIGN PATENT DOCUMENTS

JP 2004-56936 A 2/2004
JP 2004-104962 A 4/2004

(Continued)

OTHER PUBLICATIONS

International Search Report and Written Opinion dated Jan. 21, 2020, received for PCT Application PCT/JP2019/044561, Filed on Nov. 13, 2019, 9 pages including English Translation.

*Primary Examiner* — Ahmed Elnakib
(74) *Attorney, Agent, or Firm* — XSENSUS LLP

(57) ABSTRACT

Provided is a rotating electric machine. This rotating electric machine includes a stator and a rotor, and the rotor includes: a rotor core having formed therein a magnet insertion hole group; and a permanent magnet group. In the rotor core, a first magnetic slit and a second magnetic slit are formed. In the second magnetic slit, a first magnet magnetic flux guide path connecting a first q-axis magnetic path and a second q-axis magnetic path is arranged. When an angle between a straight line passing through a first intersecting point and a radial center point and a straight line passing through a second intersecting point and the radial center point is set as $\theta_1$, the number of pole pairs is set as P, a natural number is set as $m_1$, and $n_1$ is set as a natural number smaller than $m_1$, the following expression: $\theta_1 = 2\pi \times n_1 \div \{P \times (2m_1 - 1)\}$ [rad] is satisfied.

9 Claims, 18 Drawing Sheets

(58) Field of Classification Search
USPC .................................................. 310/156.01
See application file for complete search history.

(56) References Cited

U.S. PATENT DOCUMENTS

| | | | |
|---|---|---|---|
| 2018/0241262 A1* | 8/2018 | Tang | H02K 21/145 |
| 2019/0089214 A1* | 3/2019 | Tang | H02K 1/2766 |
| 2020/0287430 A1* | 9/2020 | Tago | B60T 13/74 |
| 2021/0344241 A1* | 11/2021 | Mitsuda | H02K 1/2766 |

FOREIGN PATENT DOCUMENTS

| | | |
|---|---|---|
| JP | 3819211 B2 | 9/2006 |
| JP | 2011-125163 A | 6/2011 |
| JP | 2013-123296 A | 6/2013 |
| JP | 5383915 B2 | 1/2014 |
| WO | 2019/102580 A1 | 5/2019 |

* cited by examiner

ROTATING ELECTRIC MACHINE

CROSS-REFERENCE TO RELATED APPLICATION

The present application is based on PCT filing PCT/JP20191044561, filed Nov. 13, 2019, the entire contents of which are incorporated herein by reference.

TECHNICAL FIELD

The present invention relates to a rotating electric machine including permanent magnets.

BACKGROUND ART

Hitherto, there has been known a rotating electric machine including a rotor and a stator, the rotor including: a rotor core in which a magnet insertion hole group formed of a plurality of magnet insertion holes is formed; and a permanent magnet group formed of a plurality of permanent magnets and inserted into the magnet insertion hole group. The permanent magnet group forms one magnetic pole in the rotor. A cavity being a magnetic barrier is formed in a portion of the rotor core between a radially-outer side surface of the rotor core and the magnet insertion hole group. The cavity formed in the rotor core serves to increase magnetic resistance of the rotor core in a d-axis direction thereof. This increases a salient pole ratio of the rotor. As a result, a reluctance torque generated in the rotating electric machine is improved (see, for example, PTL 1).

CITATION LIST

Patent Literature

[PTL 1] JP 3819211 B2

SUMMARY OF INVENTION

Technical Problem

However, an increase in magnetic resistance of a rotor core in a d-axis direction thereof causes great variations in magnetic resistance of the rotor core that acts on a magnetic flux passing through a radially-outer side surface of the rotor core in accordance with a circumferential position on the radially-outer side surface of the rotor core. This increases harmonic components included in the magnetic flux on the radially-outer side surface of the rotor core. As a result, there is a problem in that a harmonic iron loss caused in a stator increases.

The present invention has been made to solve the above-mentioned problem, and an object thereof is to provide a rotating electric machine capable of reducing a harmonic iron loss caused in a stator.

Solution to Problem

According to one embodiment of the present invention, there is provided a rotating electric machine including: a stator; and a rotor provided inside the stator in a radial direction of the stator, wherein the rotor includes: a rotor core having formed therein a magnet insertion hole group formed of a plurality of magnet insertion holes; and a permanent magnet group formed of a plurality of permanent magnets which are inserted into the magnet insertion hole group, wherein the plurality of magnet insertion holes forming the magnet insertion hole group are arranged side by side so that a shape of the magnet insertion hole group becomes a convex shape in which an intermediate portion protrudes from both end portions inwardly in a radial direction of the rotor core, wherein the plurality of permanent magnets forming the permanent magnet group form one magnetic pole in the rotor, wherein the rotor core has a first magnetic slit and a second magnetic slit formed in a portion of the rotor core surrounded by a radially-outer side surface of the rotor core and the magnet insertion hole group, the first magnetic slit having an arc shape in which an intermediate portion protrudes from both end portions inwardly in the radial direction of the rotor core, the second magnetic slit being provided closer to the magnet insertion hole group than the first magnetic slit is provided and having an arc shape in which an intermediate portion protrudes from both end portions inwardly in the radial direction of the rotor core, wherein a portion of the rotor core between the first magnetic slit and the second magnetic slit is set as a first q-axis magnetic path, and a portion of the rotor core between the second magnetic slit and the magnet insertion hole group is set as a second q-axis magnetic path, wherein the second magnetic slit has arranged therein a first magnet magnetic flux guide path connecting the first q-axis magnetic path and the second q-axis magnetic path to each other, wherein one of two intersecting points at which a curved line passing through a widthwise center of the first q-axis magnetic path and the radially-outer side surface of the rotor core intersect is set as a first intersecting point, and the other of the two intersecting points is set as a second intersecting point, and wherein the rotating electric machine satisfies the following expression:

$$\theta_1 = 2\pi \times n_1 \div \{P \times (2m_1 - 1)\} \text{ [rad]},$$

where: $\theta_1$ represents an angle between a straight line passing through the first intersecting point and a radial center point of the rotor core and a straight line passing through the second intersecting point and the radial center point of the rotor core; P represents the number of pole pairs; $m_1$ represents a natural number; and $n_1$ represents a natural number smaller than $m_1$.

Advantageous Effects of Invention

According to the rotating electric machine of the present invention, it is possible to reduce the harmonic iron loss caused in the stator.

DESCRIPTION OF EMBODIMENTS

First Embodiment

Figure 1:
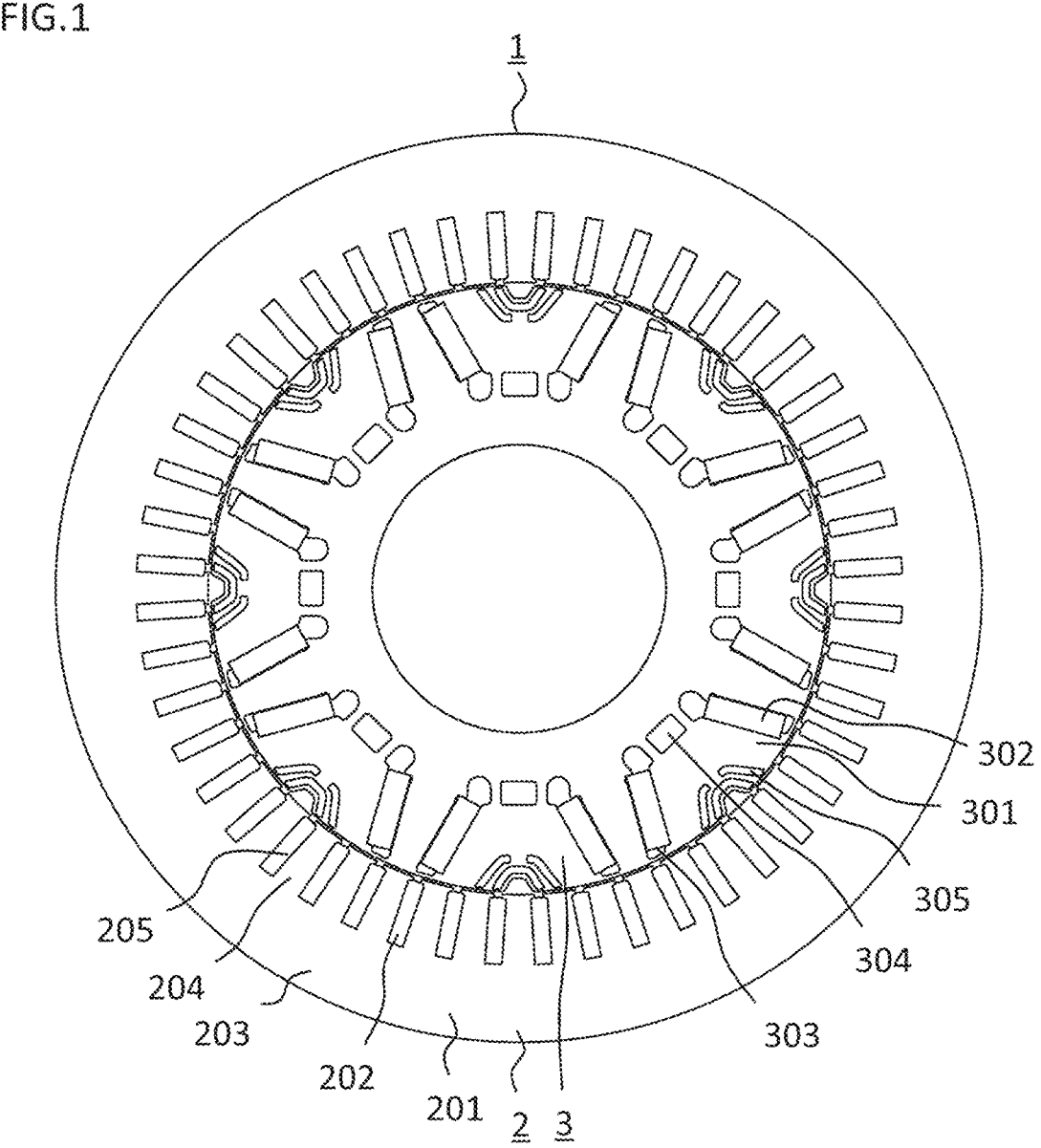
FIG. 1 is a plan view for illustrating a rotating electric machine according to a first embodiment of the present invention.

FIG. 1 is a plan view for illustrating a rotating electric machine according to a first embodiment of the present invention. A rotating electric machine 1 is a permanent magnet type rotating electric machine. The rotating electric machine 1 includes a stator 2 and a rotor 3 to be rotated with respect to the stator 2. In this example, the term "axis direction" refers to a direction along a rotation axis about which the rotor 3 is rotated, the term "radial direction" refers to a radial direction centered on the rotation axis about which the rotor 3 is rotated, and the term "circumferential direction" refers to a circumferential direction centered on the rotation axis about which the rotor 3 is rotated. The rotor 3 is arranged inside the stator 2 in the radial direction. The rotor 3 is rotated in the circumferential direction with respect to the stator 2.

The stator 2 includes a stator core 201 and a plurality of coils 202 provided in the stator core 201. The stator core 201 includes a core back 203 having a cylindrical shape and a plurality of teeth 204 protruding from the core back 203 inwardly in the radial direction. The plurality of teeth 204 are arranged side by side in the circumferential direction. A tip portion of each of the teeth 204 faces the rotor 3.

A space defined by the core back 203 and a pair of teeth 204 adjacent to each other in the circumferential direction is set as a slot 205. In other words, the slot 205 is formed between a pair of teeth 204 adjacent to each other in the circumferential direction. The coil 202 is arranged in the slot 205. In this example, the number of slots 205 is 48, and the winding method of the coil 202 is distributed winding.

The rotor 3 includes a rotor core 301 and a plurality of permanent magnet groups 302 provided in the rotor core 301. The plurality of permanent magnet groups 302 are arranged side by side in the circumferential direction. In this example, the number of permanent magnet groups 302 is eight. One permanent magnet group 302 forms one magnetic pole in the rotor 3. Therefore, in this example, the number of magnetic poles of the rotor 3 is eight.

The rotor core 301 is formed in a cylindrical shape. In the rotor core 301, a plurality of magnet insertion hole groups 303, a plurality of cavities 304, and a plurality of magnetic slit groups 305 are formed. The plurality of magnet insertion hole groups 303 are arranged at equal intervals in the circumferential direction of the rotor 3. The number of magnet insertion hole groups 303 matches the number of permanent magnet groups 302. Therefore, the number of magnet insertion hole groups 303 is eight.

The plurality of cavities 304 and the plurality of magnetic slit groups 305 are arranged at equal intervals in the circumferential direction in the same manner as the plurality of magnet insertion hole groups 303. The number of the plurality of cavities 304 and the number of the plurality of magnetic slit groups 305 each match the number of magnet insertion hole groups 303. The cavity 304 is a non-magnetic region.

Figure 2:
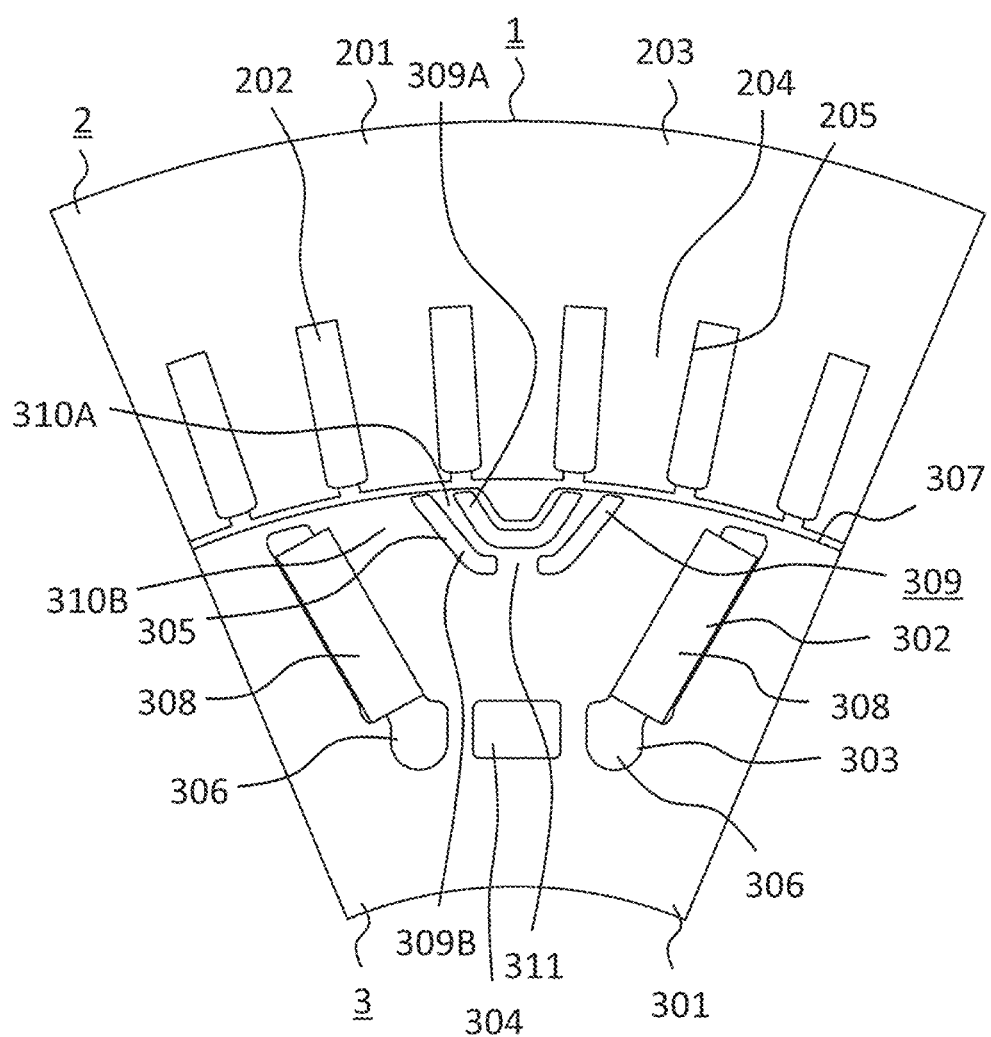
FIG. 2 is an enlarged view for illustrating a main portion of a rotating electric machine 1 of FIG. 1.

FIG. 2 is an enlarged view for illustrating a main portion of the rotating electric machine 1 of FIG. 1. FIG. 2 is an illustration of a portion of the rotor 3 that forms one magnetic pole in the rotor 3 and a portion of the stator 2 that corresponds to the portion of the rotor 3 that forms one magnetic pole. One magnet insertion hole group 303 is formed of two magnet insertion holes 306. One magnet insertion hole group 303 may be formed of three or more magnet insertion holes 306.

Two magnet insertion holes 306 forming one magnet insertion hole group 303 are arranged side by side so that a shape of the magnet insertion hole group 303 becomes a convex shape in which an intermediate portion protrudes from both end portions inwardly in the radial direction of the rotor core 301. A radially-outer side surface 307 of the rotor core 301 is a surface of the rotor core 301 that faces the outside in the radial direction. In other words, the radially-outer side surface 307 is a surface of the rotor core 301 that faces the stator 2.

One permanent magnet group 302 is formed of two permanent magnets 308. Two permanent magnets 306 inserted into two magnet insertion holes 306 forming one magnet insertion hole group 303, respectively, are each magnetized so that the surfaces on the sides close to each other have the same pole. One permanent magnet group 302 may be formed of three or more permanent magnets 308. The number of permanent magnets 308 forming one permanent magnet group 302 matches the number of magnet insertion holes 306 forming one magnet insertion hole group 303.

One permanent magnet 308 is inserted into one magnet insertion hole 306. A plurality of permanent magnets 308 may be inserted into one magnet insertion hole 306.

The magnetic slit group 305 includes a plurality of magnetic slits 309. The number of magnetic slits 309 is two. The two magnetic slits 309 are arranged parallel to each other in at least a part thereof. One of the two magnetic slits 309 is set as a first magnetic slit 309A, and the other of the two magnetic slits 309 is set as a second magnetic slit 309B. The shape of each of the two magnetic slits 309 is an arc shape in which an intermediate portion protrudes from both end portions inwardly in the radial direction of the rotor core 301. The second magnetic slit 309B is arranged closer to the magnet insertion hole group 303 than the first magnetic slit 309A is.

A portion of the rotor core 301 between the first magnetic slit 309A and the second magnetic slit 309B is set as a first q-axis magnetic path 310A. A portion of the rotor core 301 between the second magnetic slit 309B and the magnet insertion hole group 303 is set as a second q-axis magnetic path 310B. A first magnet magnetic flux guide path 311 is arranged in a radially-inner portion of the second magnetic slit 309B. The first magnet magnetic flux guide path 311 connects the first q-axis magnetic path 310A and the second q-axis magnetic path 310B to each other. The first magnet magnetic flux guide path 311 is arranged along the radial direction of the rotor core 301.

The forming of the magnetic slit group 305 in the rotor core 301 increases magnetic resistance of the rotor core 301 in a d-axis direction thereof. Thus, a salient pole ratio of the rotor 3 is increased, and a reluctance torque generated in the rotating electric machine 1 is improved.

Meanwhile, when the magnetic resistance of the rotor core 301 in the d-axis direction is increased, the magnetic resistance of the rotor core 301 acting on a magnetic flux passing through the radially-outer side surface 307 of the rotor core 301 greatly varies in accordance with a circumferential position on the radially-outer side surface 307 of the rotor core 301. This increases harmonic components included in the magnetic flux on the radially-outer side surface 307 of the rotor core 301. The harmonic components included in the magnetic flux are set as harmonics of magnetic flux. When the harmonics of magnetic flux are interlinked with the stator 2, a harmonic iron loss caused in the stator 2 increases. A mechanism by which the harmonic iron loss caused in the stator 2 increases is described below.

When an electrical angle is set as θ, an n-th order space harmonic of magnetic flux due to a magnetomotive force generated in the rotor 3 and a permeance of the rotor 3 is expressed as $A_n \sin(n\theta)$. An angle between both ends of the tooth 204 in the circumferential direction about a radial center point of the rotor core 301 is set as an electrical angle of $2\pi/a$ [rad]. In this case, a magnetic flux $\Phi$ interlinked with the tooth 204 can be considered to be obtained by integrating $A_n \sin(n\theta)$ while taking a moving average thereof in a range of $2\pi/a$ [rad]. Therefore, Expression (1) is satisfied $$\Phi = \int_{\frac{\pi}{2} - \frac{\pi}{a} + \omega t}^{\frac{\pi}{2} + \frac{\pi}{a}} A_n \sin(n\theta) = A_n \frac{\sin\frac{n\pi}{a}}{n} \times \sin\left(n\omega t + \frac{n\pi}{2}\right) \quad (1)$$

In Expression (1), ω represents an angular velocity of the rotor 3, and "t" represents a time. A magnetic flux interlinked with another tooth 204 can be handled as having a different phase difference.

A magnetic flux interlinked with the stator core 201 is obtained by adding a magnetic flux generated by a magnetomotive force generated in the stator 2 to the magnetic flux indicated in the right term of Expression (1).

Time phases of the harmonics of magnetic flux derived from the rotor 3 and the time phase of the harmonics of magnetic flux derived from the stator 2 are in a mutually inverse relationship, to thereby cause the harmonics of magnetic flux derived from the rotor 3 and the harmonics of magnetic flux derived from the stator 2 to cancel each other out. Thus, the harmonic iron loss caused in the stator 2 is reduced.

An m-th order time harmonic of magnetic flux is set as $\sin(m\omega t + \delta_{tm})$, and an m-th order space harmonic of magnetic flux is set as $\sin(m\theta + \delta_{\theta m})$. The symbol $\delta_{tm}$ represents an initial phase of the m-th order time harmonic of magnetic flux, and the symbol $\delta_{\theta m}$ represents an initial phase of the m-th order space harmonic of magnetic flux. The symbol θ represents the electrical angle.

A natural number is set as $m_1$, and two orders of space harmonics of magnetic fluxes generated in the rotor 3 are set as $2m_1-1$ and $2m_1+1$. It is assumed that a $(2m_1-1)$th order space harmonic of magnetic flux and a $(2m_1+1)$th order space harmonic of magnetic flux are in phase with each other. In this case, in accordance with Expression (1), a time phase difference between a $(2m_1-1)$th order time harmonic of magnetic flux and a $(2m_1+1)$th order time harmonic of magnetic flux that are exhibited when interlinked with the stator core 201 becomes $(2m_1-1)\times\pi/2-(2m_1+1)\times\pi/2=-\pi$ [rad]. Therefore, in this case, the $(2m_1-1)$th order time harmonic of magnetic flux and the $(2m_1+1)$th order time harmonic of magnetic flux that are exhibited when interlinked with the stator core 201 are in phases opposite to each other.

Meanwhile, it is assumed that the $(2m_1-1)$th order space harmonic of magnetic flux and the $(2m_1+1)$th order space harmonic of magnetic flux are in phases opposite to each other. In this case, in accordance with Expression (1), the time phase difference between the $(2m_1-1)$th order time harmonic of magnetic flux and the $(2m_1+1)$th order time harmonic of magnetic flux that are exhibited when interlinked with the stator core 201 becomes $(2m_1-1)\times\pi/2+\pi-(2m_1+1)\times\pi/2=0$ [rad]. Therefore, in this case, the $(2m_1-1)$th order time harmonic of magnetic flux and the $(2m_1+1)$th order time harmonic or magnetic flux that are exhibited when interlinked with the stator core 201 are in phase with each other.

In order to cause the harmonics of magnetic flux derived from the rotor 3 and the harmonics of magnetic flux derived from the stator 2 to cancel each other out, it is required to satisfy Expression (2).

$$\delta_s - \delta_r = \pi \times (2n_1 - 1) \text{ [rad]} \quad (2)$$

In Expression (2), $\delta_s$ represents a time phase difference between the $(2m_1-1)$th order time harmonic of magnetic flux and the $(2m_1+1)$th order time harmonic of magnetic flux that are generated in the stator 2, $\delta_r$ represents a space phase difference between the $(2m_1-1)$th order space harmonic of magnetic flux and the $(2m_1+1)$th order space harmonic of magnetic flux that are generated in the rotor 3, and $n_1$ represents a natural number smaller than $m_1$.

Figure 3:
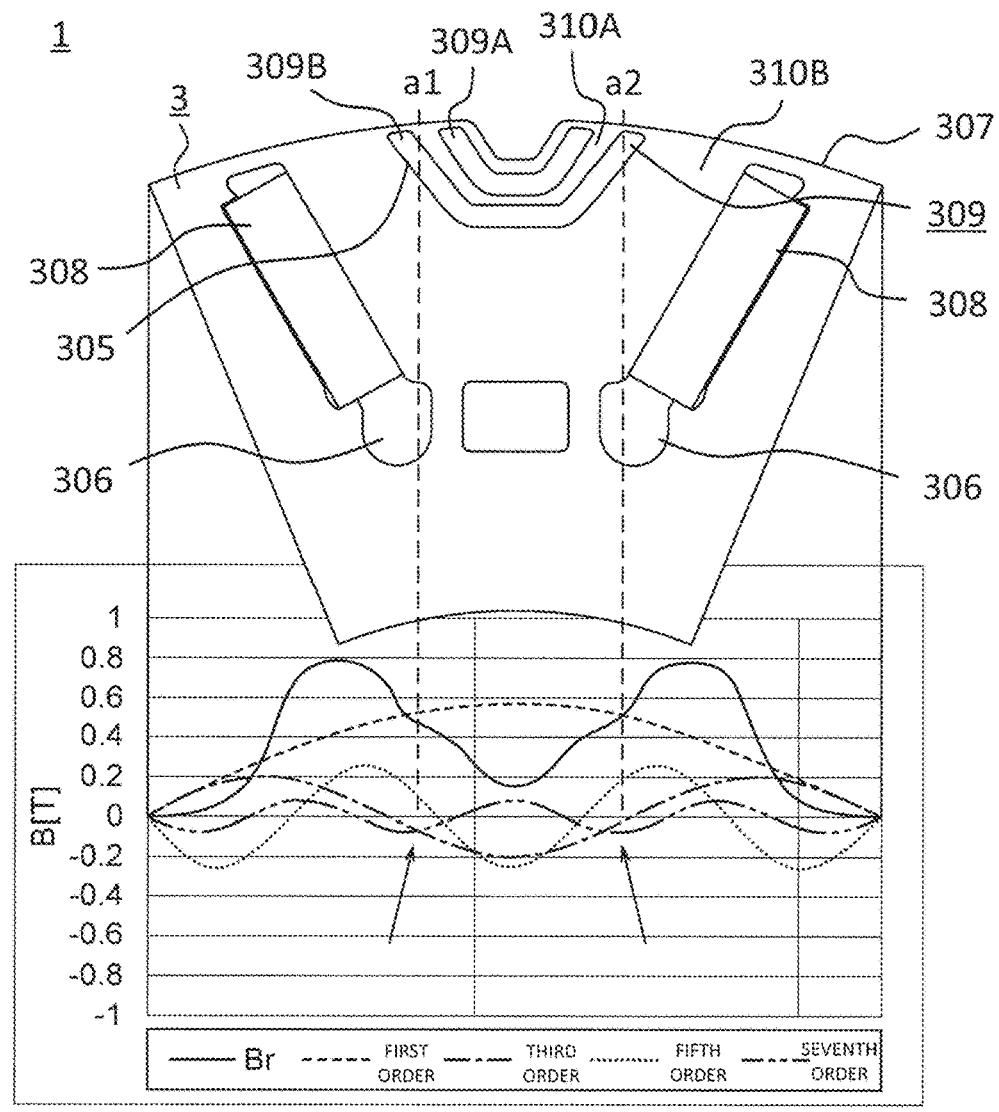
FIG. 3 is a view for illustrating a magnetic flux density distribution on a radially-outer side surface of a rotor in a rotating electric machine according to a first comparative example of the first embodiment.
Figure 4:
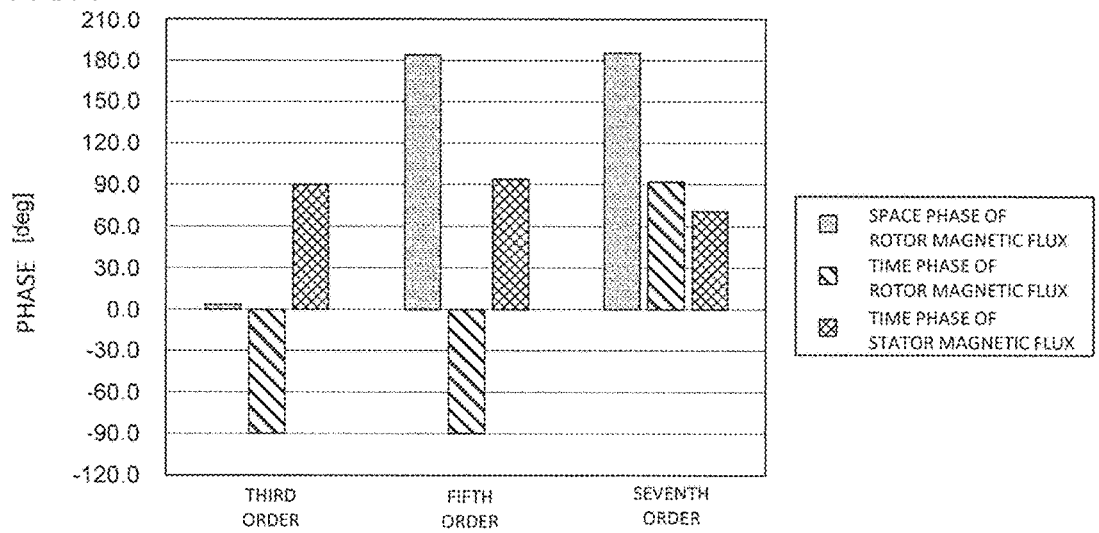
FIG. 4 is a graph for showing space phases of magnetic fluxes generated in the rotor in the rotating electric machine of FIG. 3, time phases of magnetic fluxes generated in the rotor to be interlinked with a stator, and time phases of magnetic fluxes generated in the stator.

FIG. 3 is a view for illustrating a magnetic flux density distribution on the radially-outer side surface 307 of the rotor 3 in the rotating electric machine 1 according to a first comparative example of the first embodiment. In FIG. 3, first order, third order, fifth order, and seventh order components obtained when the magnetic flux density distribution is frequency-analyzed are also illustrated. FIG. 4 is a graph for showing space phases of magnetic fluxes generated in the rotor 3 in the rotating electric machine 1 of FIG. 3, time phases of magnetic fluxes generated in the rotor 3 to be interlinked with the stator 2, and time phases of magnetic fluxes generated in the stator 2.

The space phase of a third-order harmonic of magnetic flux generated in the rotor 3 is approximately 0 degrees. Therefore, when the third-order harmonic of magnetic flux generated in the rotor 3 is interlinked with the stator core 201, the time phase of the third-order harmonic of magnetic flux generated in the rotor 3 becomes −90 [deg] in accordance with Expression (1).

The space phase of a fifth order harmonic of magnetic flux generated in the rotor 3 is 180 degrees. Therefore, when the fifth order harmonic of magnetic flux generated in the rotor 3 is interlinked with the stator core 201, the time phase of the fifth order harmonic of magnetic flux generated in the rotor 3 becomes −90 [deg] in accordance with Expression (1).

The space phase of a seventh order harmonic of magnetic flux generated in the rotor 3 is 180 degrees. Therefore, when the seventh order harmonic of magnetic flux generated in the rotor 3 is interlinked with the stator core 201, the time phase of the seventh order harmonic of magnetic flux generated in the rotor 3 becomes +90 [deg] in accordance with Expression (1). The space phase of the harmonic of magnetic flux of each order depends on, for example, shapes of the magnetic slits 309 and shapes of the permanent magnets 308.

Meanwhile, the time phases of the third-order, fifth order, and seventh order harmonics of magnetic fluxes that are generated in the stator 2 are all 90 [deg]. Therefore, in the rotating electric machine 1 according to the comparative example, the third-order harmonic of magnetic flux generated in the rotor 3 and the third-order harmonic of magnetic flux generated in the stator 2 cancel each other out, and the fifth order harmonic of magnetic flux generated in the rotor 3 and the fifth order harmonic of magnetic flux generated in the stator 2 cancel each other out.

However, the seventh order harmonic of magnetic flux generated in the rotor 3 and the seventh order harmonic of magnetic flux generated in the stator 2 strengthen each other. This is because, in the rotating electric machine 1 according to the first comparative example, the space phases of the fifth order and seventh order harmonics of magnetic fluxes that are generated in the rotor 3 are in phase with each other, and the time phases of the fifth order and seventh order harmonics of magnetic fluxes that are generated in the stator 2 are in phase with each other.

In order to cause the seventh order harmonic of magnetic flux generated in the rotor 3 and the seventh order harmonic of magnetic flux generated in the stator 2 to cancel each other out, the time phases of the fifth order and seventh order harmonics of magnetic fluxes generated in the rotor 3 are required to be in phases opposite to each other. In other words, it is required to invert the phase of the seventh order harmonic of magnetic flux generated in the rotor 3.

As illustrated in FIG. 3, at an electrical angle a1 and an electrical angle a2, the seventh order harmonic of magnetic flux generated in the rotor 3 is convex downward. In FIG. 3, downwardly convex portions of the seventh order harmonic of magnetic flux are indicated by the arrows. This is because the magnetic slit group 305 blocks the magnetic fluxes emitted from the permanent magnet group 302. In order to invert the phase of the seventh order harmonic of magnetic flux generated in the rotor 3, it is required to cause the seventh order harmonic of magnetic flux generated in the rotor 3 to become convex upward at the electrical angle a1 and the electrical angle a2.

Figure 5:
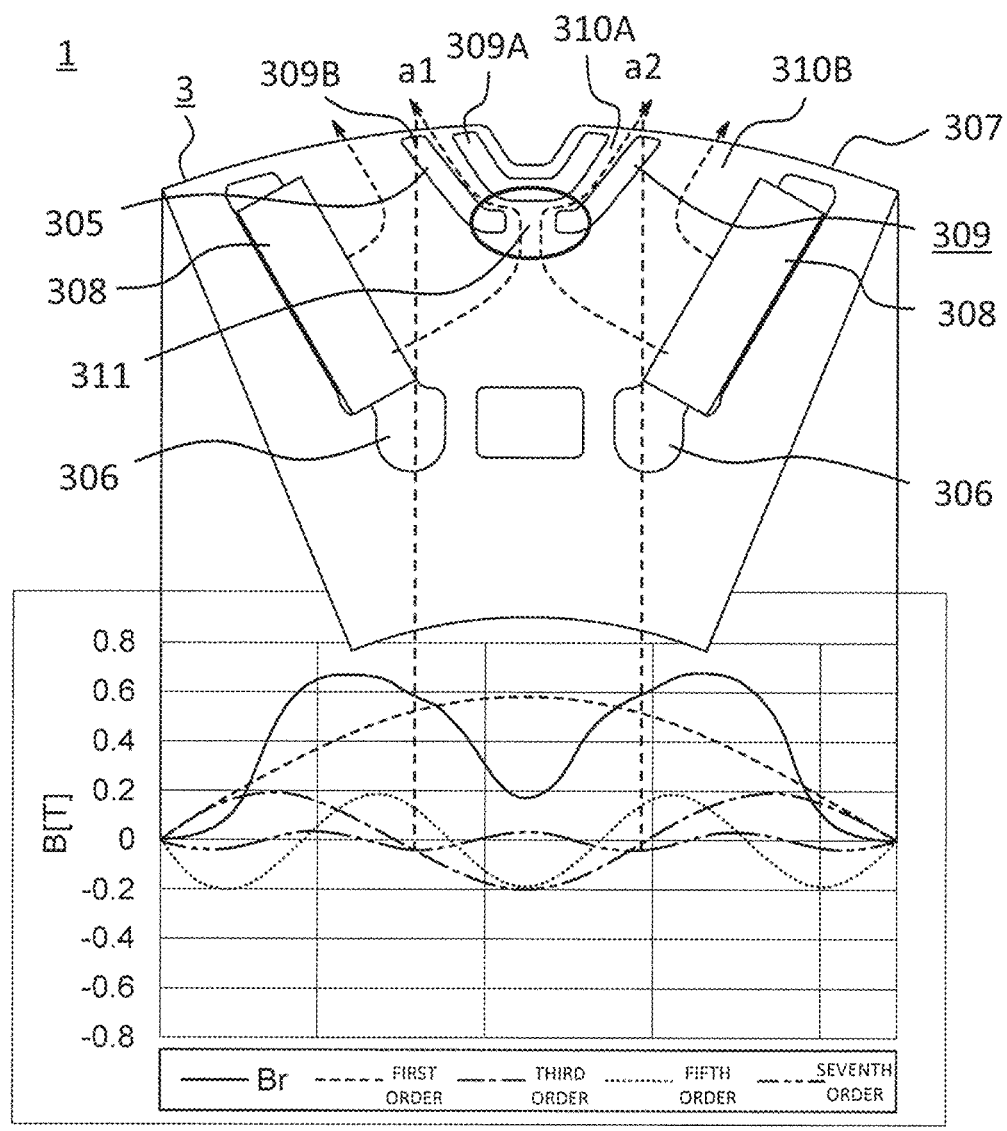
FIG. 5 is a view for illustrating a magnetic flux density distribution on the radially-outer side surface of the rotor in the rotating electric machine 1 of FIG. 1.
Figure 6:
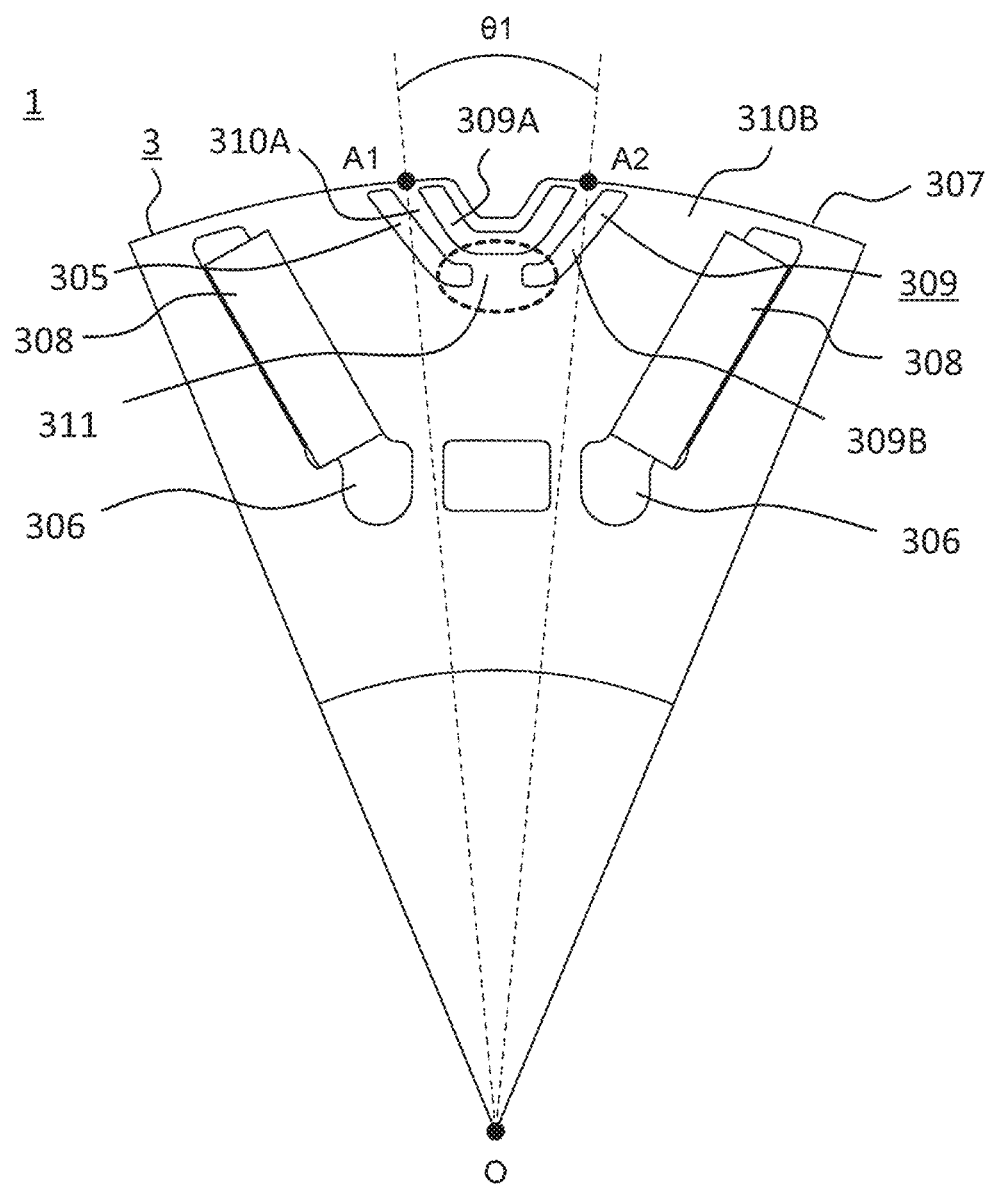
FIG. 6 is as enlarged view for illustrating a main portion of the rotor of FIG. 1.

FIG. 5 is a view for illustrating a magnetic flux density distribution on the radially-outer side surface 307 of the rotor 3 in the rotating electric machine 1 of FIG. 1. In FIG. 5, the first-order, third-order, fifth order, and seventh order components obtained when the magnetic flux density distribution is frequency-analyzed are also illustrated. FIG. 6 is an enlarged view for illustrating a main portion of the rotor 3 of FIG. 1.

The first magnet magnetic flux guide path 311 is arranged in a radially-inner portion of the second magnetic slit 309B. The first magnet magnetic flux guide path 311 connects the first q-axis magnetic path 310A and the second q-axis magnetic path 310B to each other. The first magnet magnetic flux guide path 311 guides magnetic fluxes emitted from the permanent magnet group 302 to a portion between the first magnetic slit 309A and the second magnetic slit 309B. Thus, the magnetic fluxes emitted from the permanent magnet group 302 are guided at portions of the electrical angle a1 and the electrical angle a2 on the radially-outer side surface 307. Therefore, an amplitude of the seventh order harmonic of magnetic flux generated in the rotor 3 becomes smaller than in the rotating electric machine 1 according to the comparative example. In FIG. 5, at the electrical angle a1 and the electrical angle a2, the seventh order harmonic of magnetic flux generated in the rotor 3 is convex downward.

One of two intersecting points at which a curved line passing through a widthwise center of the first q-axis magnetic path 310A and a radially-outer side surface of the rotor core 301 intersect is set as a first intersecting point A1, and the other of the two intersecting points is set as a second intersecting point A2. An angle between a straight line passing through the first intersecting point A1 and a radial center point O of the rotor core 301 and a straight line passing through the second intersecting point A2 and the radial center point O of the rotor core 301 is set as $\theta_1$. The angle $\theta_1$ is required to be a position of an antinode of a $(2m-1)$th order harmonic of magnetic flux. This is because it is required to guide the magnetic flux to the position of the antinode of the harmonics of magnetic flux in order to invert the phase of the harmonics of magnetic flux. Therefore, when the number of pole pairs is set as P, a natural number is set as $m_1$, and a natural number smaller than $m_1$ is set as $n_1$, it is required to satisfy Expression (3) in order to increase an amplitude of the $(2m-1)$th order harmonic of magnetic flux.

$$\theta_1 = 2\pi \times n_1 \div \{P \times (2m_1-1)\} \text{ [rad]} \quad (3)$$

In addition, in order to increase the amplitude of the $(2m_1-1)$th order harmonic of magnetic flux among the harmonics of magnetic fluxes of a plurality of orders, one or more natural numbers $m_1$ that satisfy Expression (3) are required to be present. In this case, the amplitude of the seventh order harmonic of magnetic flux is reduced.

Figure 7:
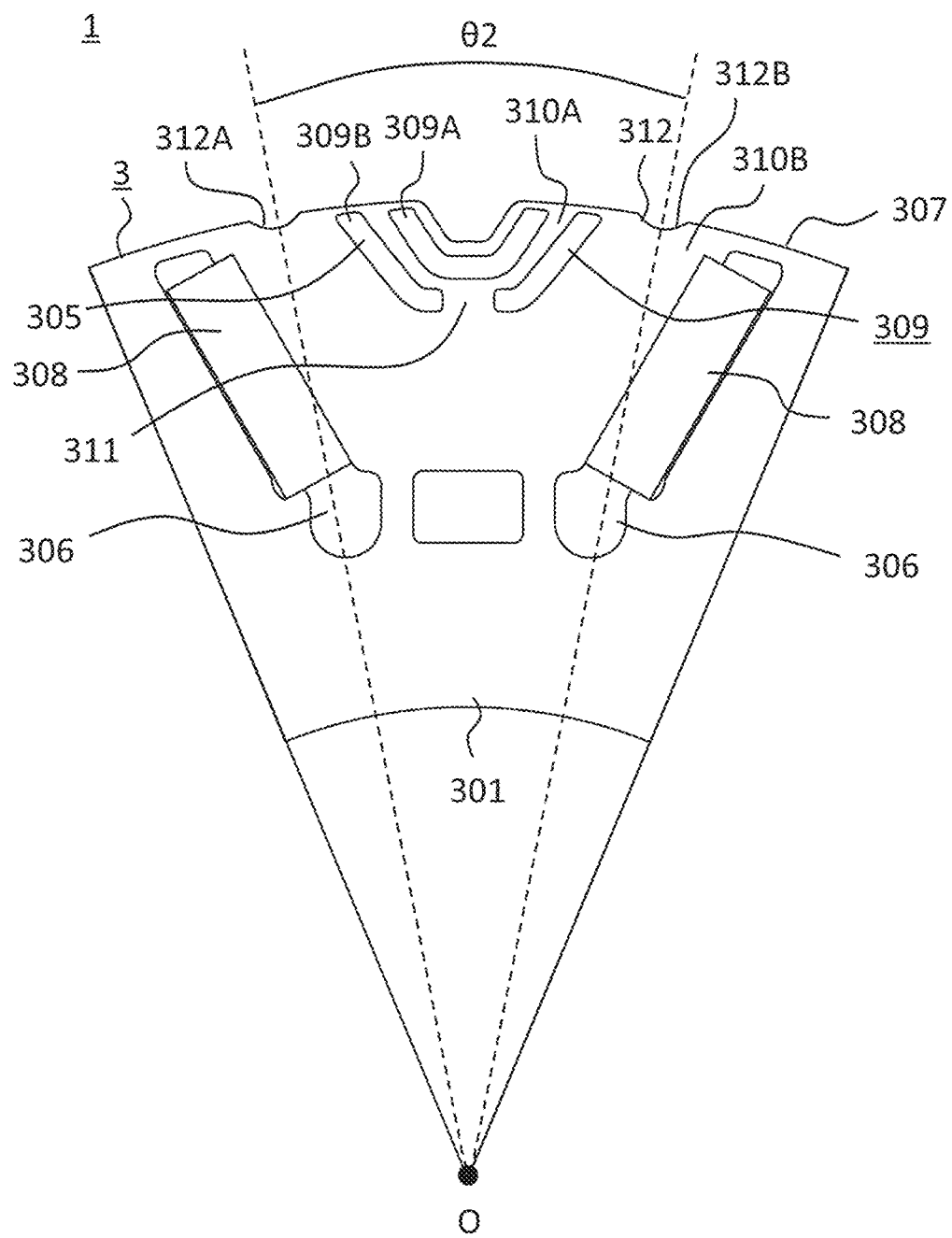
FIG. 7 is a view for illustrating a main portion of the rotor of FIG. 6 in a modification example.
Figure 8:
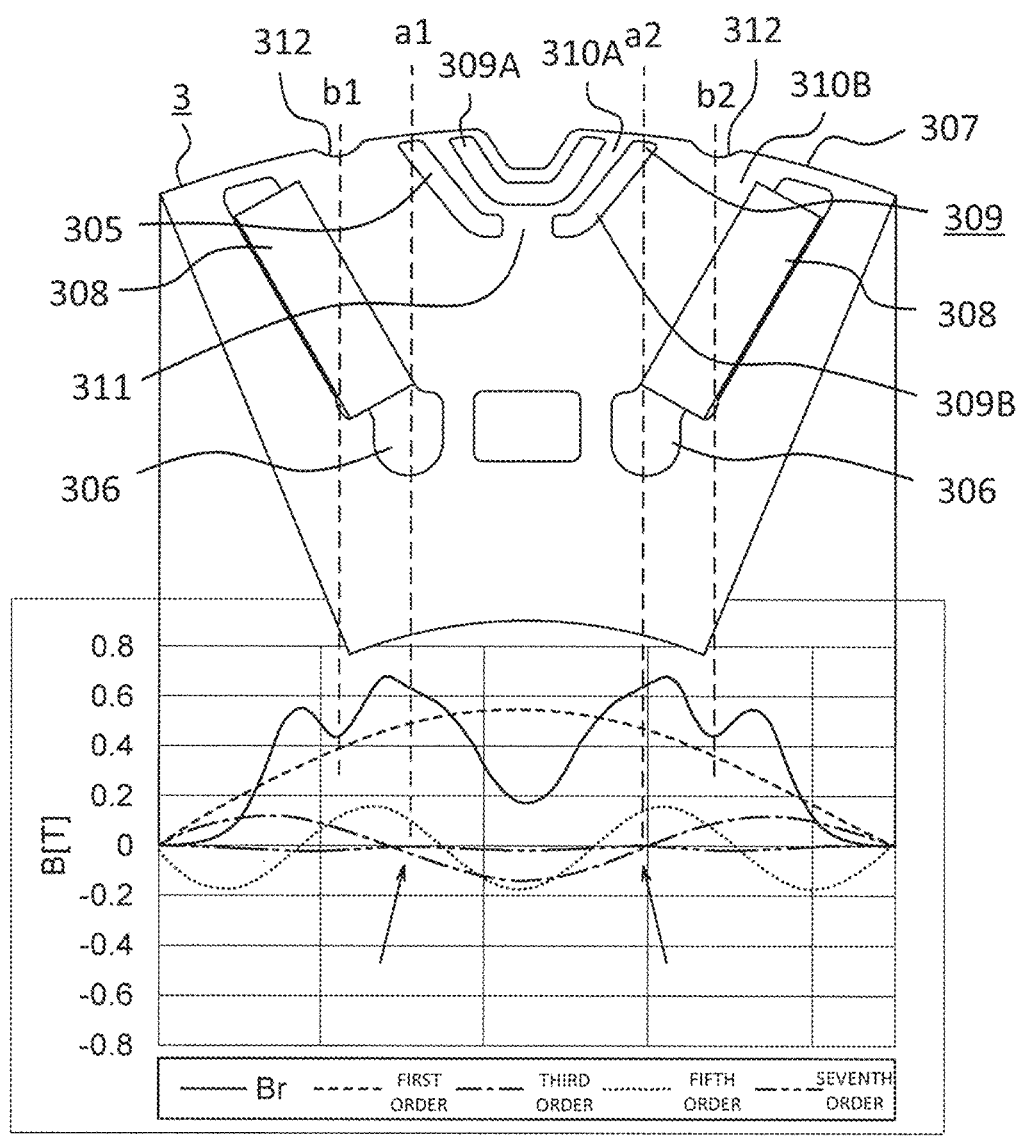
FIG. 8 is a view for illustrating a magnetic flux density distribution on a radially-outer side surface of the rotor of FIG. 7.
Figure 9:
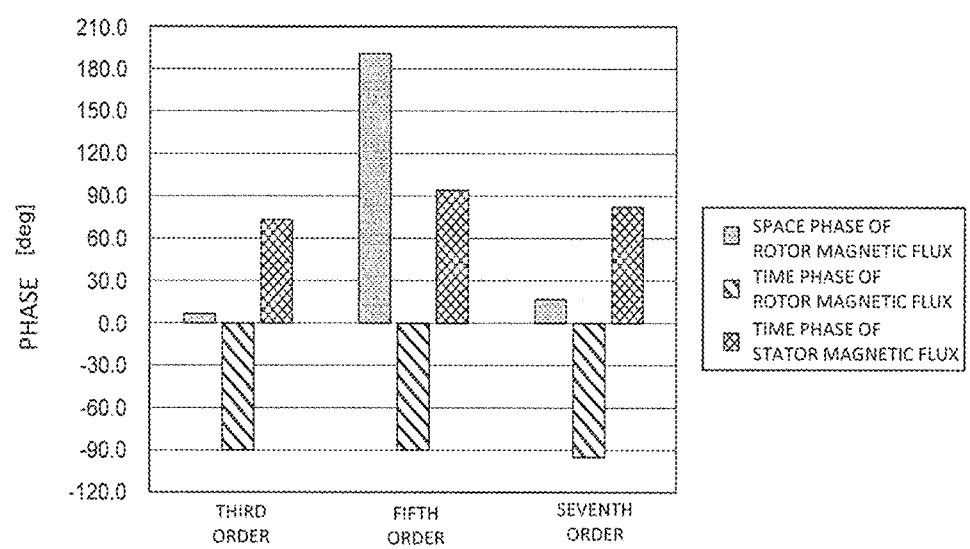
FIG. 9 is a graph for showing space phases of magnetic fluxes generated in the rotor in the rotating electric machine of FIG. 1, time phases of magnetic fluxes generated in the rotor to be interlinked with a stator, and time phases of magnetic fluxes generated in the stator.

FIG. 7 is a view for illustrating a main portion of the rotor 3 of FIG. 6 in a modification example. FIG. 8 is a view for illustrating a magnetic flux density distribution on the radially-outer side surface 307 of the rotor 3 of FIG. 7. FIG. 9 is a graph for showing space phases of magnetic fluxes generated in the rotor 3 in the rotating electric machine 1 of FIG. 1, time phases of magnetic fluxes generated in the rotor 3 to be interlinked with the stator 2, and time phases of magnetic fluxes generated in the stator 2.

A recessed portion 312 being a magnetic barrier is formed at each of positions of an electrical angle b1 and an electrical angle b2 on the radially-outer side surface 307. This further reduces the amplitude of the seventh order harmonic of magnetic flux. The phase of the seventh order harmonic of magnetic flux is inverted as compared to that of the seventh order harmonic of magnetic flux shown in FIG. 5. Thus, in all the third order, fifth order, and seventh order harmonics of magnetic fluxes, the time phase of the harmonics of magnetic flux generated in the rotor 3 and the time phase of the harmonics of magnetic flux generated in the stator 2 are inverse to each other. As a result, the harmonics of magnetic fluxes cancel each other out.

The recessed portions 312 are formed at two spots corresponding to the second q-axis magnetic path 310B on the radially-outer side surface 307 of the rotor core 301, respectively. One of the recessed portions 312 formed at the two spots is set as a first recessed portion 312A, and the other of the recessed portions 312 formed at the two spots is set as a second recessed portion 312B. An angle between a straight line passing through a widthwise center of the first recessed portion 312A and the radial center point O of the rotor core 301 and a straight line passing through a widthwise center of the second recessed portion 312B and the radial center point of the rotor core 301 is set as $\theta_2$. A natural number is set as $m_2$, and a natural number smaller than $m_2$ is set as $n_2$. In this case, Expression (4) is satisfied.

$$\theta_2 = 2\pi \times n_2 \div \{P \times (2m_2 - 1)\} \text{ [rad]} \quad (4)$$

Figure 10:
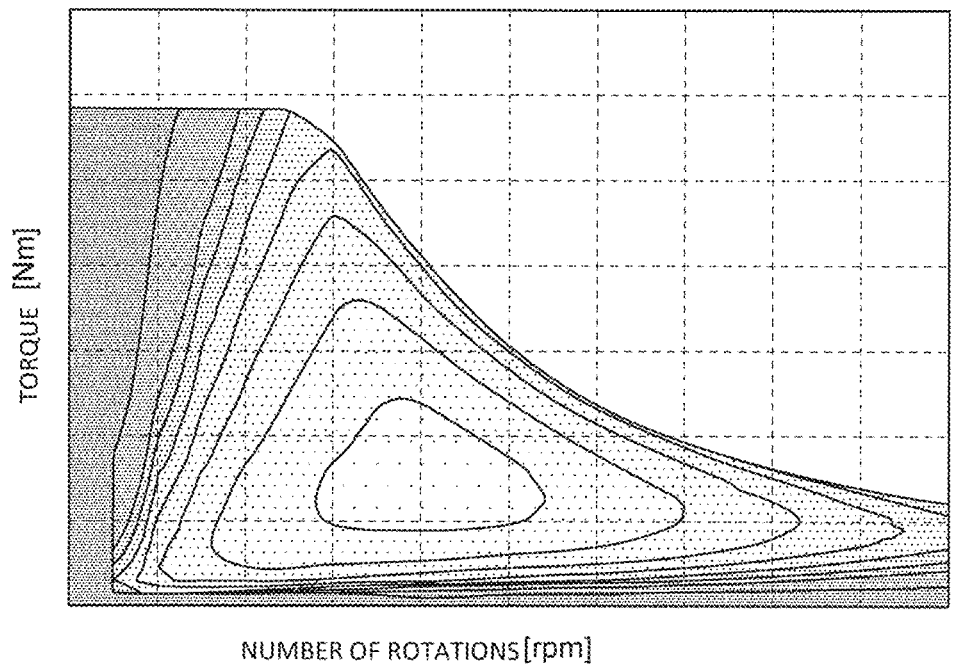
FIG. 10 is a graph for showing a relationship between the number of rotations and torque of the rotor of FIG. 3.
Figure 11:
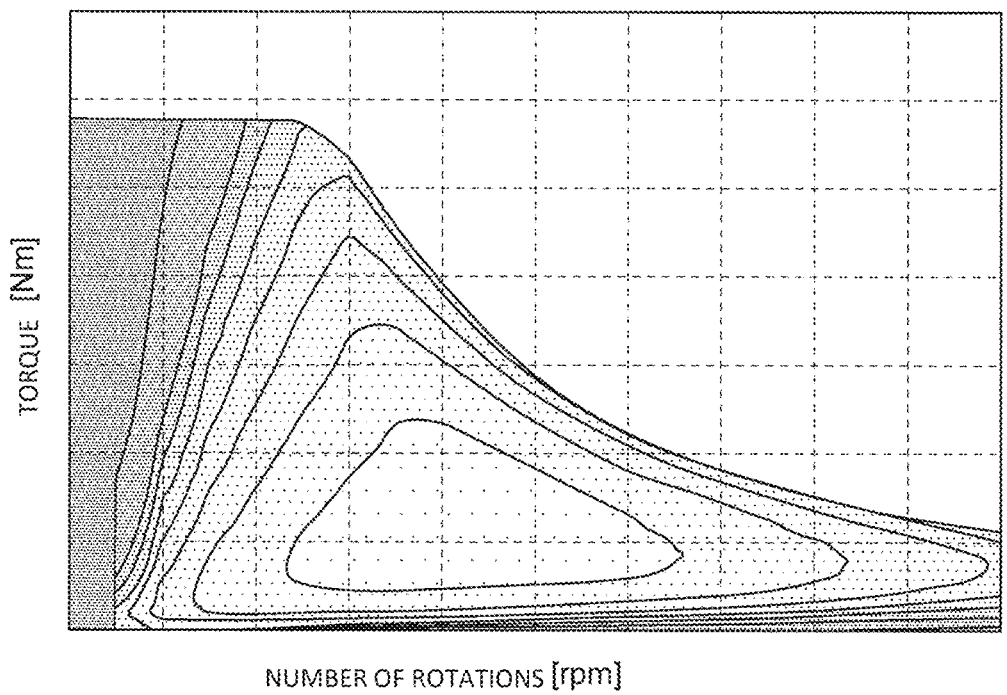
FIG. 11 is a graph for showing a relationship between the number of rotations and torque of the rotor of FIG. 7.

FIG. 10 is a graph for showing a relationship between the number of rotations and torque of the rotor 3 of FIG. 3. FIG. 11 is a graph for showing a relationship between the number of rotations and torque of the rotor 3 of FIG. 7. In FIG. 10 and FIG. 11, the darker color indicates lower efficiency of the rotating electric machine 1, and the lighter color indicates higher efficiency of the rotating electric machine 1. As compared to the rotating electric machine 1 according to the first comparative example provided with the rotor 3 of FIG. 3, the rotating electric machine 1 according to the first embodiment provided with the rotor 3 of FIG. 7 has the harmonic iron loss in the stator 2 reduced, and is improved in efficiency in a region in which the number of rotations is high.

Figure 12:
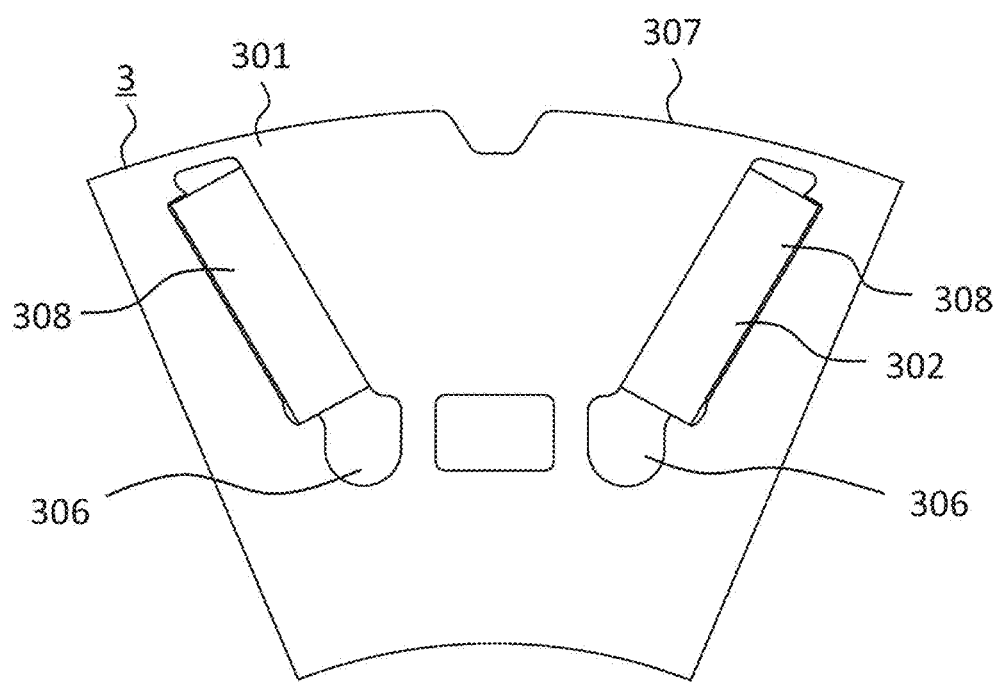
FIG. 12 is a front view for illustrating a main portion of the rotor in a second comparative example of the first embodiment.

FIG. 12 is a front view for illustrating a main portion of the rotor 3 in a second comparative example of the first embodiment. In the rotor 3 in the second comparative example, the magnetic slit group 305 is not formed in the rotor core 301. When the magnetic slit group 305 is not formed, the magnetic fluxes emitted from the permanent magnet group 302 cannot be guided to specific positions on the radially-outer side surface 307. Thus, magnetic fluxes flow evenly into a portion of the rotor core 301 surrounded by the permanent magnet group 302. As a result, is not possible to obtain the harmonics of magnetic flux that satisfy Expression (3).

In the first embodiment, a current advance angle of a current energizing the coil 202 is set to 45 degrees or more. The setting of the current advance angle to 45 degrees or more enables a d-axis current to be increased and the harmonics of magnetic flux ascribable to the magnetic flux emitted from the permanent magnet 308 to be effectively weakened.

As described above, in the rotating electric machine 1 according to the first embodiment, $\theta_1 = 2\pi \times n_1 \div \{P \times (2m_1 - 1)\}$ [rad] is satisfied. Thus, the space phase of the harmonics of magnetic flux generated in the rotor 3 can be inverted. As a result, the harmonic iron loss caused in the stator 2 can be reduced.

In addition, in the rotating electric machine 1, $\delta_s - \delta_r = \pi \times (2n_1 - 1)$ [rad] is satisfied. The harmonic iron loss caused in the stator 2 can be reduced.

Further, in the rotating electric machine 1, $\theta_2 = 2\pi \times n_2 \div \{P \times (2m_2 - 1)\}$ [rad] is satisfied. Thus, the space phase of the harmonics of magnetic flux generated in the rotor 3 can be inverted. As a result, the harmonic iron loss caused in the stator 2 can be reduced.

Second Embodiment

Figure 13:
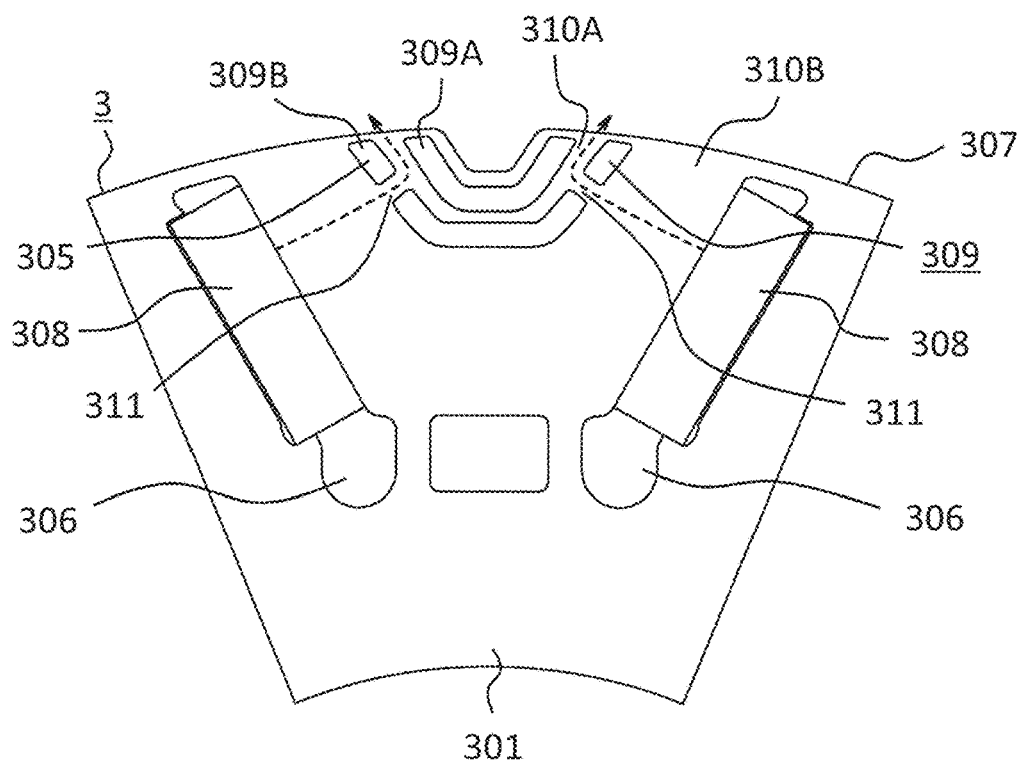
FIG. 13 is a plan view for illustrating a main portion of a rotor of a rotating electric machine according to a second embodiment of the present invention.

FIG. 13 is a plan view for illustrating a main portion of a rotor of a rotating electric machine according to a second embodiment of the present invention. FIG. 13 is an illustration of a portion of the rotor 3 that forms one magnetic pole in the rotor 3. In the second magnetic slit 309B, the first magnet magnetic flux guide path 311 is arranged at a portion closest to the permanent magnet 308. In the second embodiment, the first magnet magnetic flux guide paths 311 are arranged at two spots of the second magnetic slit 309B. The magnetic flux emitted from the permanent magnet 308 is guided to each of the first magnet magnetic flux guide paths 311. The other configurations are the same as those of the first embodiment.

As described above, in the rotating electric machine 1 according to the second embodiment, the harmonic iron loss caused in the stator 2 can be reduced in the same manner as in the first embodiment. In addition, the first magnet magnetic flux guide paths 311 are formed at the two spots of the second magnetic slit 309B. Thus, the strength of the rotor 3 can be improved. Further, as compared to a case in which the first magnet magnetic flux guide path 311 is arranged in the radially-inner portion of the second magnetic slit 309B, the magnetic fluxes emitted from the permanent magnets 308 can be easily guided to the first magnet magnetic flux guide path 311.

Third Embodiment

Figure 14:
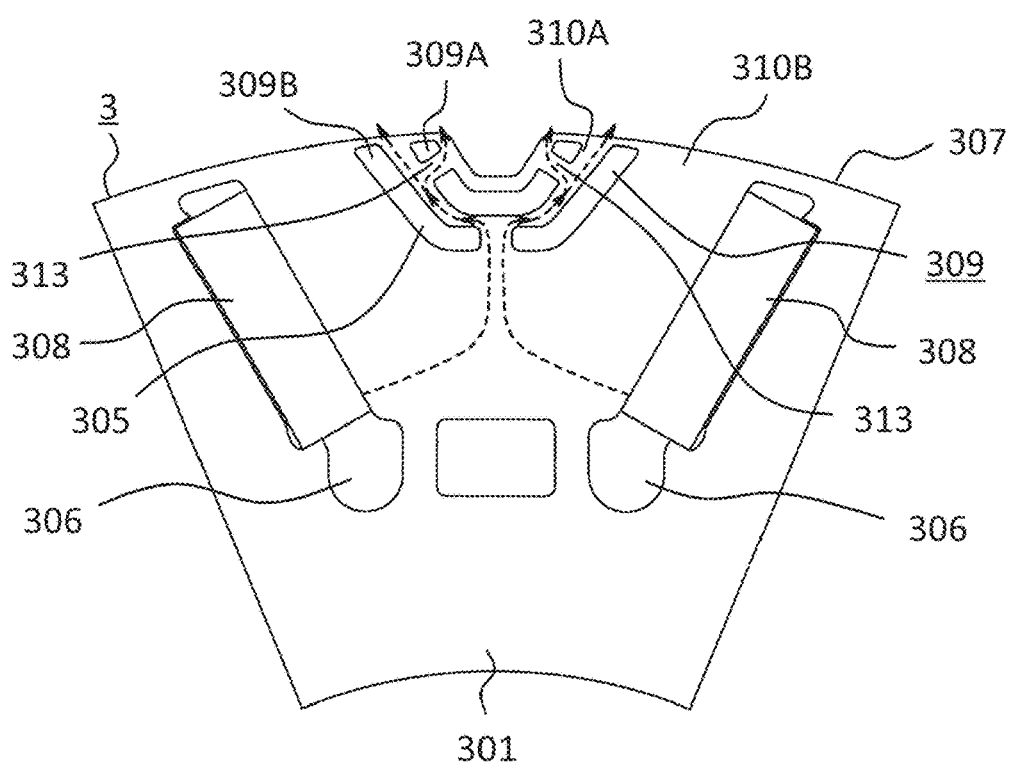
FIG. 14 is a plan view for illustrating a main portion of a rotor of a rotating electric machine according to a third embodiment of the present invention.

FIG. 14 is a plan view for illustrating a main portion of a rotor of a rotating electric machine according to a third embodiment of the present invention. FIG. 14 is an illustration of a portion of the rotor 3 that forms one magnetic pole in the rotor 3. In the first magnetic slit 309A, second magnet magnetic flux guide path 313 is arranged at a portion that faces the second magnetic slit 309B. In the third embodiment, the second magnet magnetic flux guide paths 313 are arranged at two spots of the first magnetic slit 309A.

The second magnet magnetic flux guide paths 313 connect the first q-axis magnetic path 310A and a portion of the rotor core 301 that is farther apart from the permanent magnets 308 than the first magnetic slit 309A is to each other. The second magnet magnetic flux guide paths 313 guide the magnetic fluxes passing through the portion of the rotor core 301 between the first magnetic slit 309A and the second magnetic slit 309B to the portion of the rotor core 301 that is farther apart from the permanent magnets 308 than the first magnetic slit 309A is. When an angle formed by points at which extension lines of regions through which the magnetic fluxes guided to the second magnet magnetic flux guide paths 313 pass intersect with the radially-outer side surface 307 and the radial center point O of the rotor 3 is set as $\theta_1$, Expression (3) is satisfied. The other configurations are the same as those of the first embodiment or the second embodiment.

As described above, in the rotating electric machine 1 according to the third embodiment, the harmonic iron loss caused in the stator 2 can be reduced in the same manner as in the first embodiment. Further, the increased number of outlets for the magnetic fluxes exiting from the radially-outer side surface 307 enables phase adjustment to be performed for a plurality of m-th order space harmonics that satisfy Expression (3).

Fourth Embodiment

Figure 15:
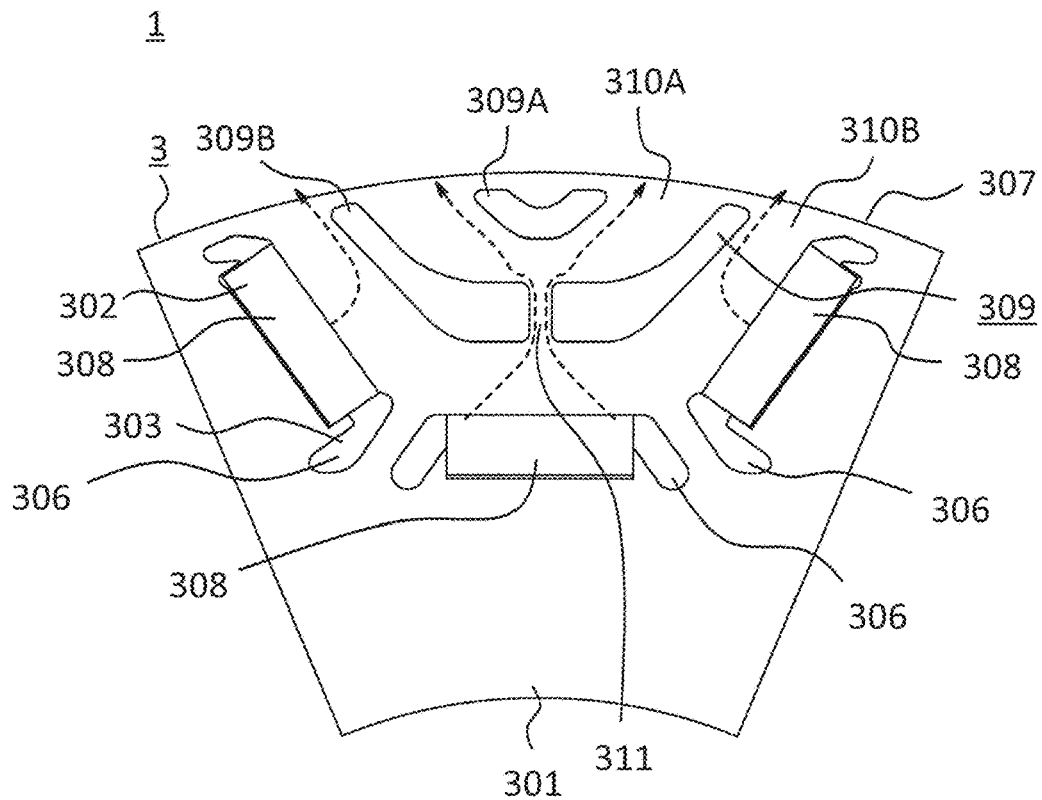
FIG. 15 is a plan view for illustrating a main portion of a rotor of a rotating electric machine according to a fourth embodiment of the present invention.

FIG. 15 is a plan view for illustrating a main portion of a rotor of a rotating electric machine according to a fourth embodiment of the present invention. FIG. 15 is an illustration of a portion of the rotor 3 that forms one magnetic pole in the rotor 3. One magnet insertion hole group 303 has three magnet insertion holes 306. One permanent magnet group 302 has three permanent magnets 308.

The first magnet magnetic flux guide path 311 is arranged in the inner portion of the second magnetic slit 309B in the radial direction of the rotor 3. In other words, the first magnet magnetic flux guide path 311 is arranged at the center of the magnetic pole. Thus, the magnetic flux emitted from the permanent magnet 308 arranged in the center of the three permanent magnets 308 is guided to the first magnet magnetic flux guide path 311. The magnetic fluxes emitted from the permanent magnets 308 arranged at both ends of the three permanent magnets 308 each pass through the portion of the rotor core 301 between the second magnetic slit 309B and the magnet insertion hole group 303 toward the radially-outer side surface 307. The other configurations are the same as those of the first embodiment to the third embodiment.

As described above, in the rotating electric machine 1 according to the fourth embodiment, the harmonic iron loss caused in the stator 2 can be reduced in the same manner as in the first embodiment. In addition, magnetic saturation is inhibited from occurring in the region of the rotor core 301 between the second magnetic slit 309B and the magnet insertion hole group 303. Therefore, it is possible to arrange the magnetic slit group 305 without reducing the reluctance torque.

Fifth Embodiment

Figure 16:
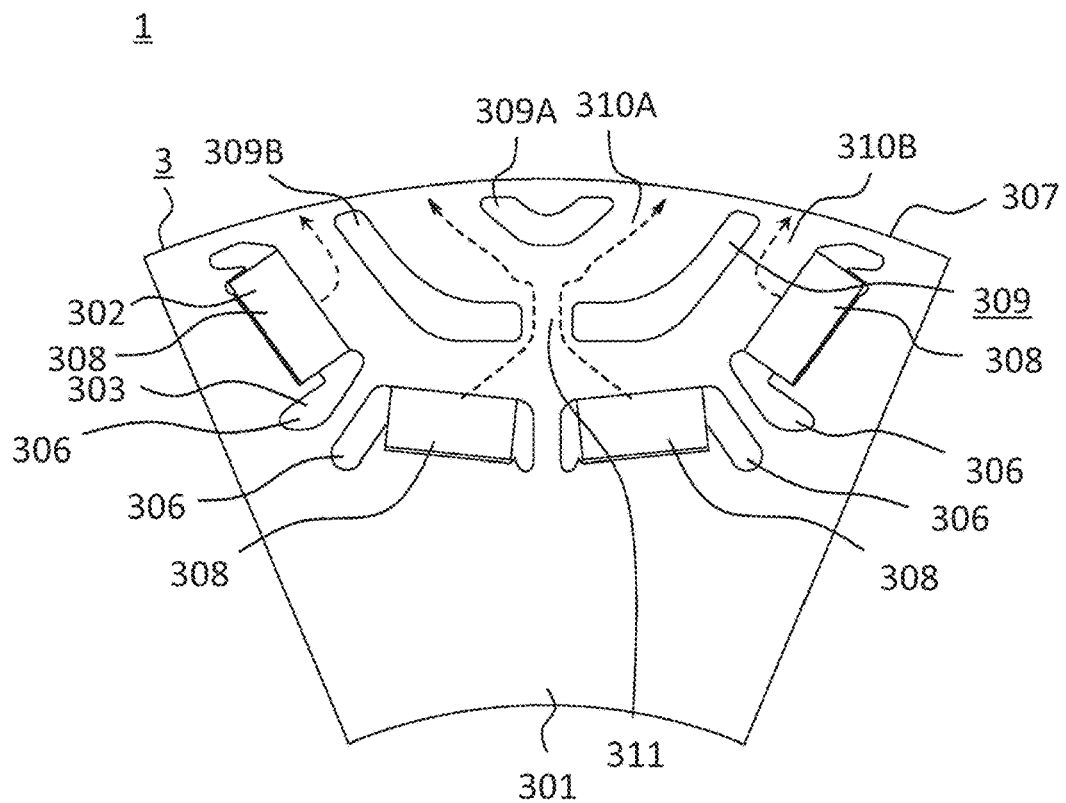
FIG. 16 is a plan view for illustrating a main portion of a rotor of a rotating electric machine according to a fifth embodiment of the present invention.

FIG. 16 is a plan view for illustrating a main portion of a rotor of a rotating electric machine according to a fifth embodiment of the present invention. FIG. 16 is an illustration of a portion of the rotor 3 that forms one magnetic pole in the rotor 3. One magnet insertion hole group 303 has four magnet insertion holes 306. One permanent magnet group 302 has four permanent magnets 308.

The first magnet magnetic flux guide path 311 is arranged in the inner portion of the second magnetic slit 309B in the radial direction of the rotor 3. In other words, the first magnet magnetic flux guide path 311 is arranged at the center of the magnetic pole. Thus, the magnetic fluxes emitted from the two permanent magnets 308 arranged on the center side of the four permanent magnets 308 are guided to the first magnet magnetic flux guide path 311. The magnetic fluxes emitted from the two permanent magnets 308 arranged at both ends of the four permanent magnets 308 each pass through the portion of the rotor core 301 between the second magnetic slit 309B and the magnet insertion hole group 303 toward the radially-outer side surface 307. The other configurations are the same as those of the first embodiment to the fourth embodiment.

As described above, in the rotating electric machine 1 according to the fifth embodiment, the harmonic iron loss caused in the stator 2 can be reduced in the same manner as in the first embodiment. In addition, magnetic saturation is inhibited from occurring in the region of the rotor core 301 between the second magnetic slit 309B and the magnet insertion hole group 303. Therefore, is possible to arrange the magnetic slit group 305 without reducing the reluctance torque.

Figure 17:
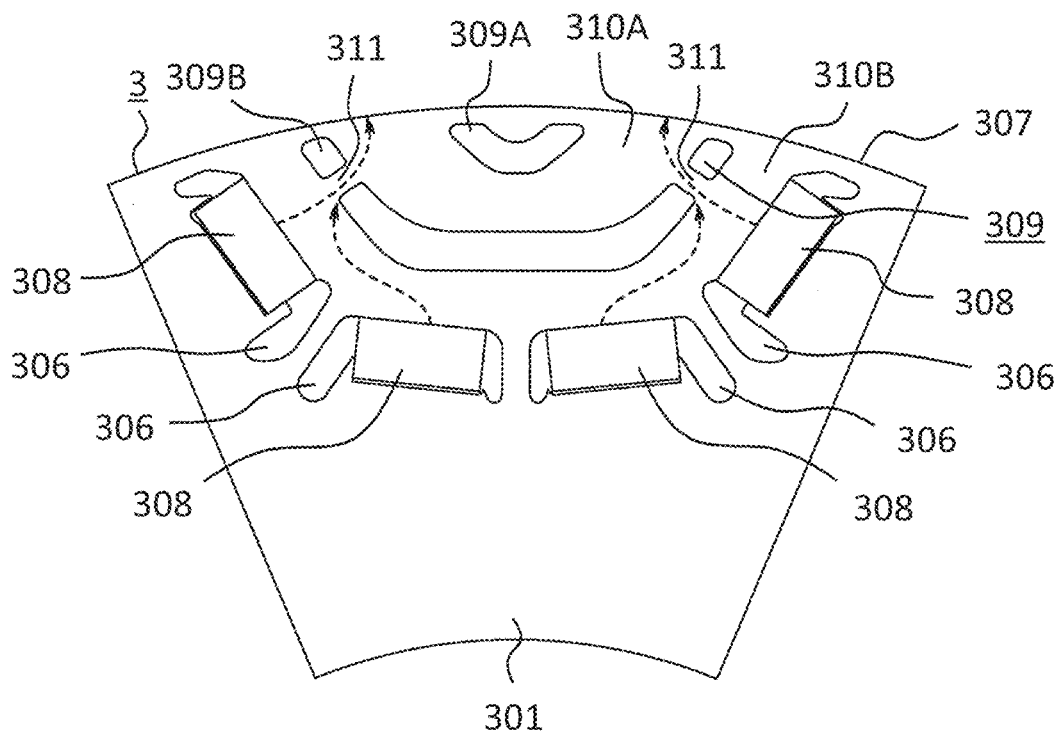
FIG. 17 is a plan view for illustrating a main portion of a rotor of a rotating electric machine according to a modification example of the fifth embodiment.

FIG. 17 is a plan view for illustrating a main portion of the rotor 3 of the rotating electric machine 1 according to a modification example of the fifth embodiment. In the second magnetic slit 309B, the first magnet magnetic flux guide path 311 may be arranged at a portion closest to the permanent magnet 308. In the modification example of the fifth embodiment, the first magnet magnetic flux guide paths 311 are arranged at two spots of the second magnetic slit 309B. In this case, the magnetic fluxes emitted from the two permanent magnets 308 are guided to the first magnet magnetic flux guide path 311.

Sixth Embodiment

Figure 18:
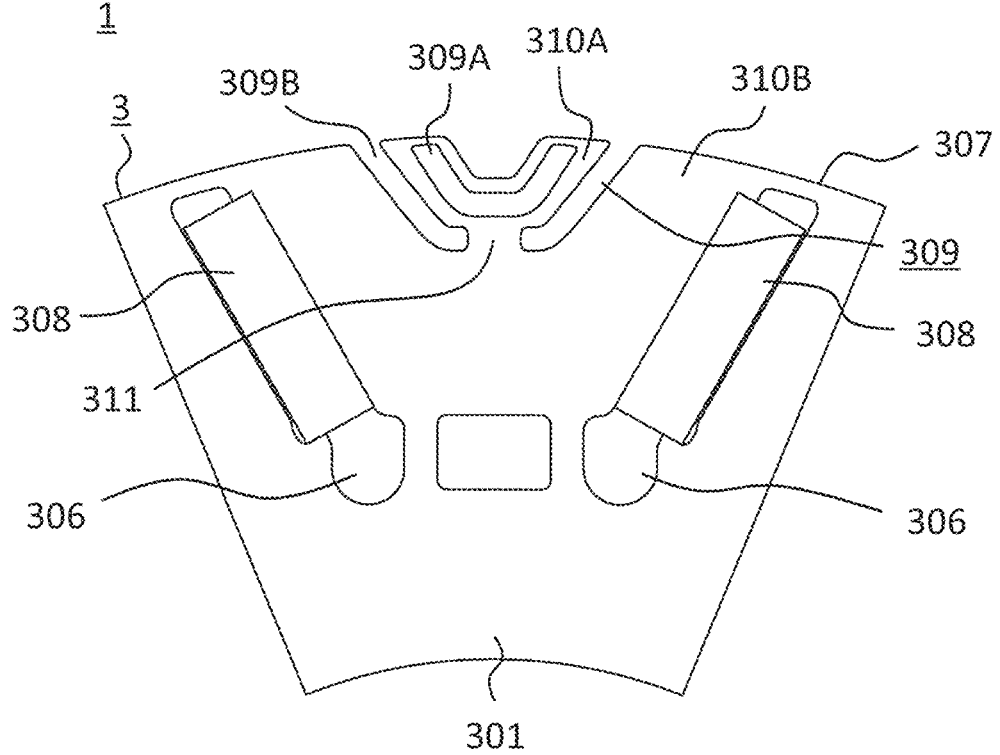
FIG. 18 is a plan view for illustrating a main portion of a rotor of a rotating electric machine according to a sixth embodiment of the present invention.

FIG. 18 is a plan view for illustrating a main portion of a rotor of a rotating electric machine according to a sixth embodiment of the present invention. Portions of the second magnetic slit 309B on the radially-outer side surface 307 side are connected to the radially-outer side surface 307. In other words, radially-outer side portions of the first q-axis magnetic path 310A and the second q-axis magnetic path 310B are isolated from each other. Therefore, there is no bridge connecting the first q-axis magnetic path 310A and the second q-axis magnetic path 310B in a portion of the rotor core 301 on the radially-outer side surface 307 side. The other configurations are the same as those of the first embodiment to the fifth embodiment.

As described above, in the rotating electric machine 1 according to the sixth embodiment, the radially-outer side portions of the first q-axis magnetic path 310A and the second q-axis magnetic path 310B are isolated from each other. Therefore, it is possible to inhibit the magnetic fluxes emitted from the permanent magnets 308 from passing between the first q-axis magnetic path 310A and the second q-axis magnetic path 310B in the portion of the rotor core 301 on the radially-outer side surface 307 side. It is also possible to inhibit the magnetic flux generated in the coil 202 from passing between the first q-axis magnetic path 310A and the second q-axis magnetic path 310B in the portion of the rotor core 301 on the radially-outer side surface 307 side.

Seventh Embodiment

Figure 19:
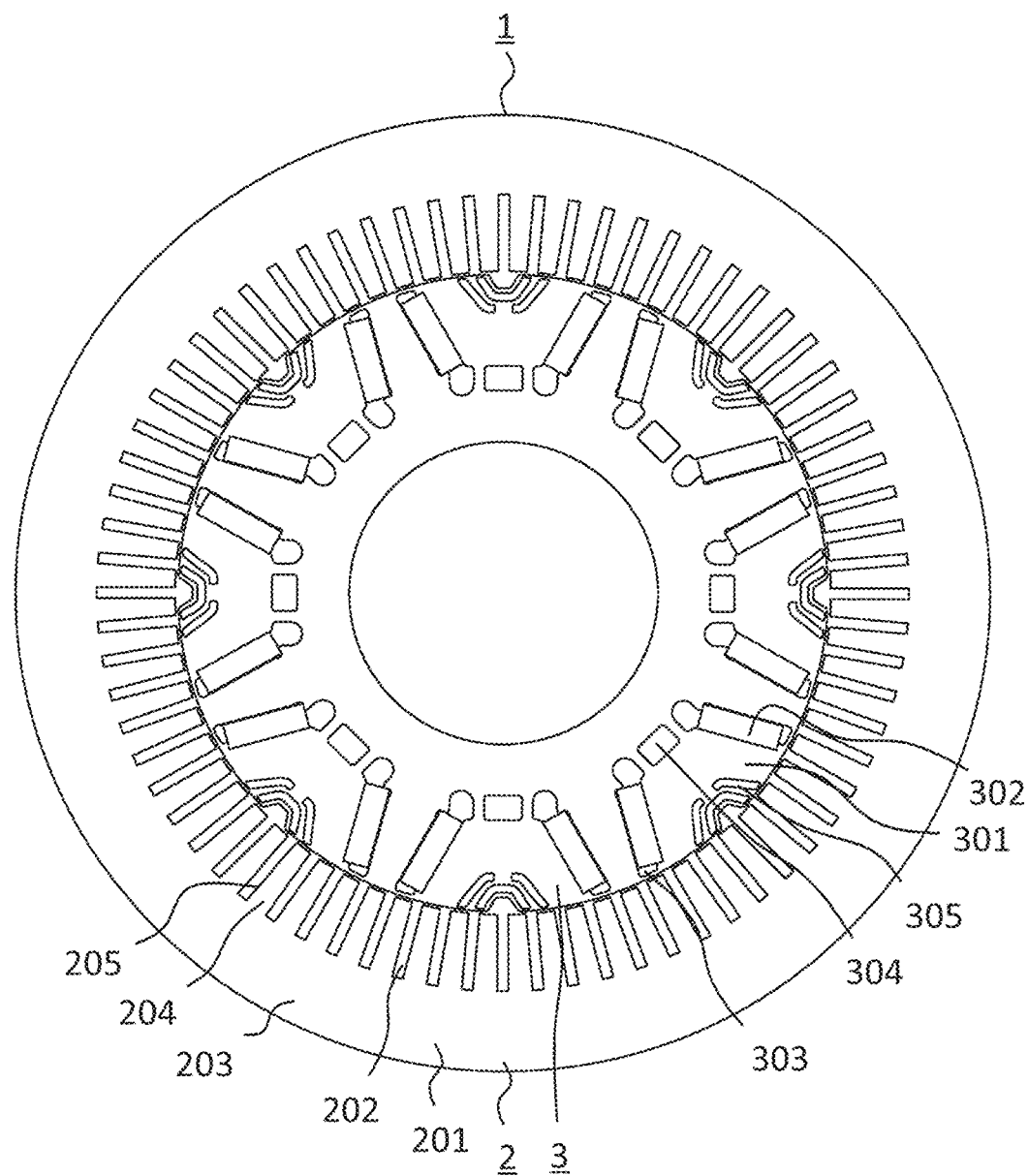
FIG. 19 is a plan view for illustrating a rotating electric machine according to a seventh embodiment of the present invention.

FIG. 19 is a plan view for illustrating a rotating electric machine according to a seventh embodiment of the present invention. In the rotating electric machine 1 according to the first embodiment, the number of slots for each pole and each phase is two, the number of magnetic poles is eight, the number of slots is 48, and the winding method of the coil 202 is distributed winding. In the rotating electric machine 1 according to the seventh embodiment, the number of slots for each pole and each phase is three, the number of magnetic poles is eight, the number of slots is 72, and the winding method of the coil is distributed winding. The coil may be wound in a short section in which a coil pitch is shorter than a magnetic pole pitch.

Figure 20:
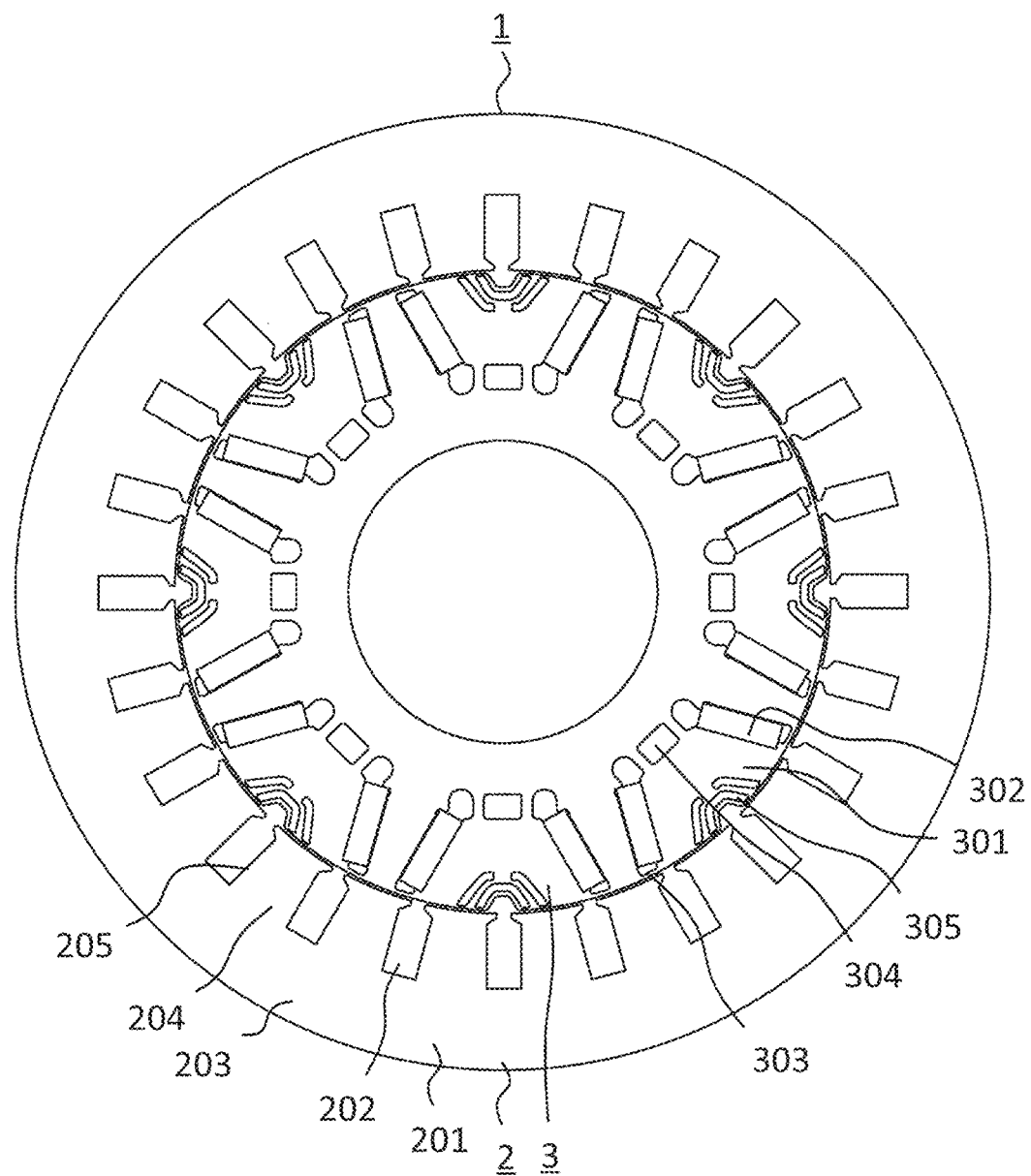
FIG. 20 is a plan view for illustrating a rotating electric machine according to a modification example of the seventh embodiment.

FIG. 20 is a plan view for illustrating a rotating electric machine according to a modification example of the seventh embodiment. The rotating electric machine 1 in which the number of slots for each pole and each phase is one, the number of magnetic poles is eight, the number of slots is 24, and the winding method of the coil 202 is distributed winding may be employed. The other configurations are the same as those of the first embodiment to the sixth embodiment.

As described above, in the rotating electric machine 1 according to the seventh embodiment, the number of slots for each pole and each phase is three. When the number of slots for each pole and each phase is changed, the phase of the magnetic flux interlinked with each of the teeth 204 of the stator 2 is changed. Therefore, the degree of design freedom in designing the stator 2 so that the phase is inverted from the magnetic flux generated in the rotor 3 is improved.

Eighth Embodiment

Figure 21:
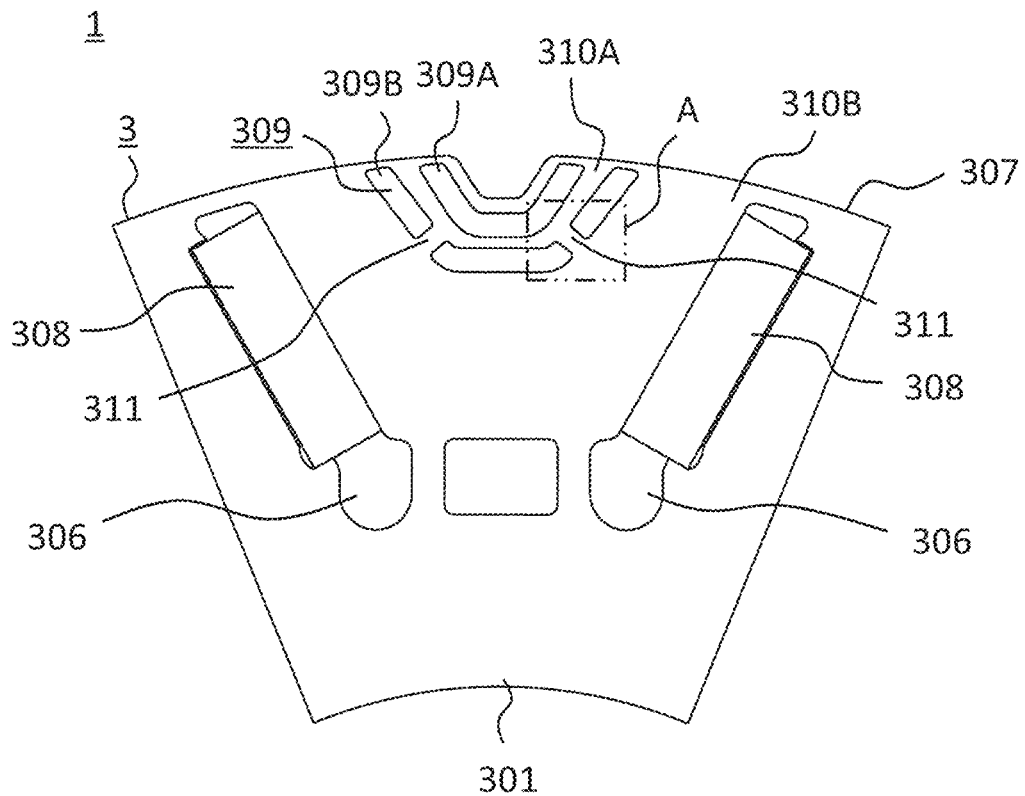
FIG. 21 is a plan view for illustrating a main portion of a rotor of a rotating electric machine according to an eighth embodiment of the present invention.
Figure 22:
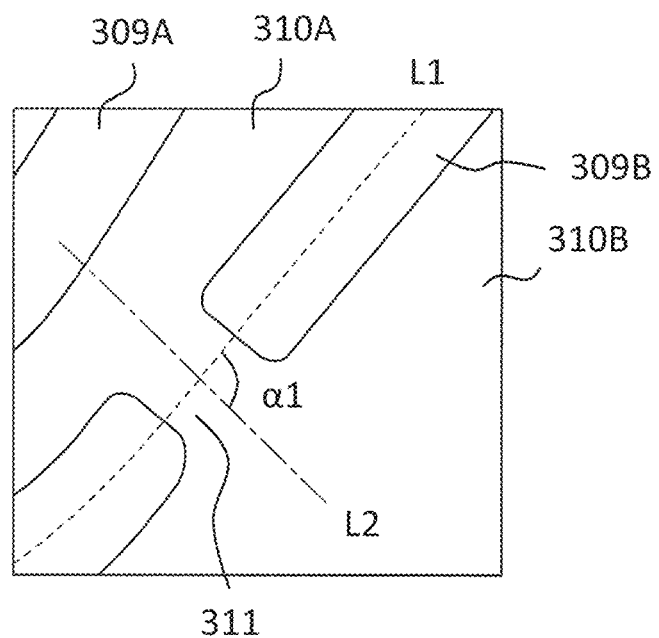
FIG. 22 is as enlarged view for illustrating a portion A of FIG. 21.

FIG. 21 is a plan view for illustrating a main portion of a rotor of a rotating electric machine according to an eighth embodiment of the present invention. FIG. 22 is an enlarged view for illustrating a portion A of FIG. 21. In the eighth embodiment, in the second magnetic slit 309B, the first magnet magnetic flux guide path 311 is arranged at a portion closest to the permanent magnet 308. In the eighth embodiment, the first magnet magnetic flux guide paths 311 are arranged at two spots of the second magnetic slit 309B.

A curved line passing along the second magnetic slit 309B through a widthwise center of the second magnetic slit 309B is set as a virtual center curved line L1. A straight line passing along the first magnet magnetic flux guide path 311 through a widthwise center of the first magnet magnetic flux guide path 311 is set as a virtual center straight line L2. The virtual center curved line L1 and the virtual center straight line L2 are obtained by a method of least squares. An angle between a tangential line of the virtual center curved line L1 and the virtual center straight line L2 at an intersection point of the virtual center curved line L1 and the virtual center straight line L2 is set as $\alpha_1$. In this case, $\alpha_1 = 90$ [deg].

Figure 23:
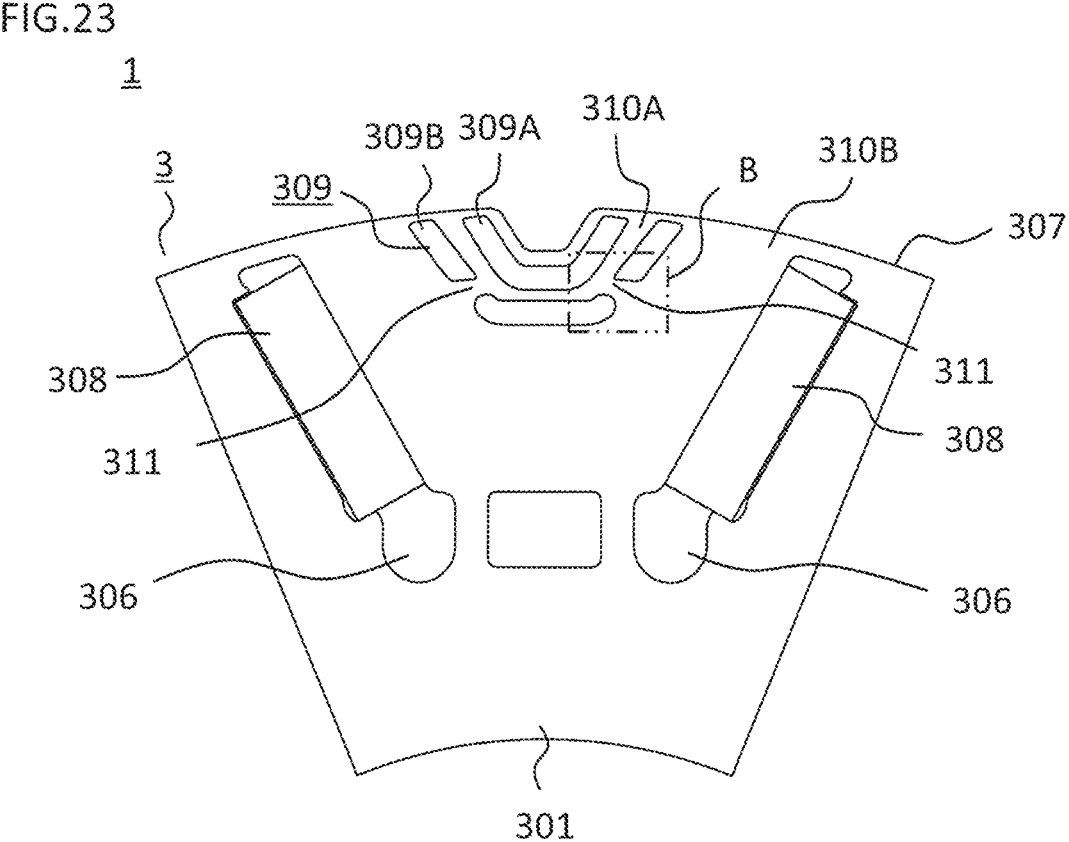
FIG. 23 is a plan view for illustrating a main portion of a stator in a first comparative example of the eighth embodiment.
Figure 24:
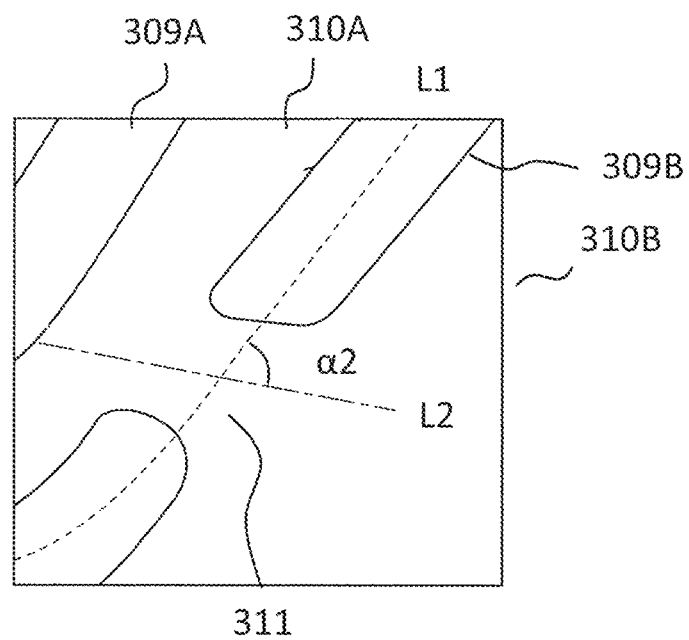
FIG. 24 is an enlarged view for illustrating a portion B of FIG. 23.

FIG. 23 is a plan view for illustrating a main portion of the rotor 3 in a first comparative example of the eighth embodiment. FIG. 24 is an enlarged view for illustrating a portion B of FIG. 23. An angle between the tangential line of the virtual center curved line L1 and the virtual center straight line L2 at the intersection point of the virtual center curved line L1 and the virtual center straight line L2 is set as $\alpha_2$. In the first comparative example, $\alpha_2 < 90$ [deg].

Figure 25:
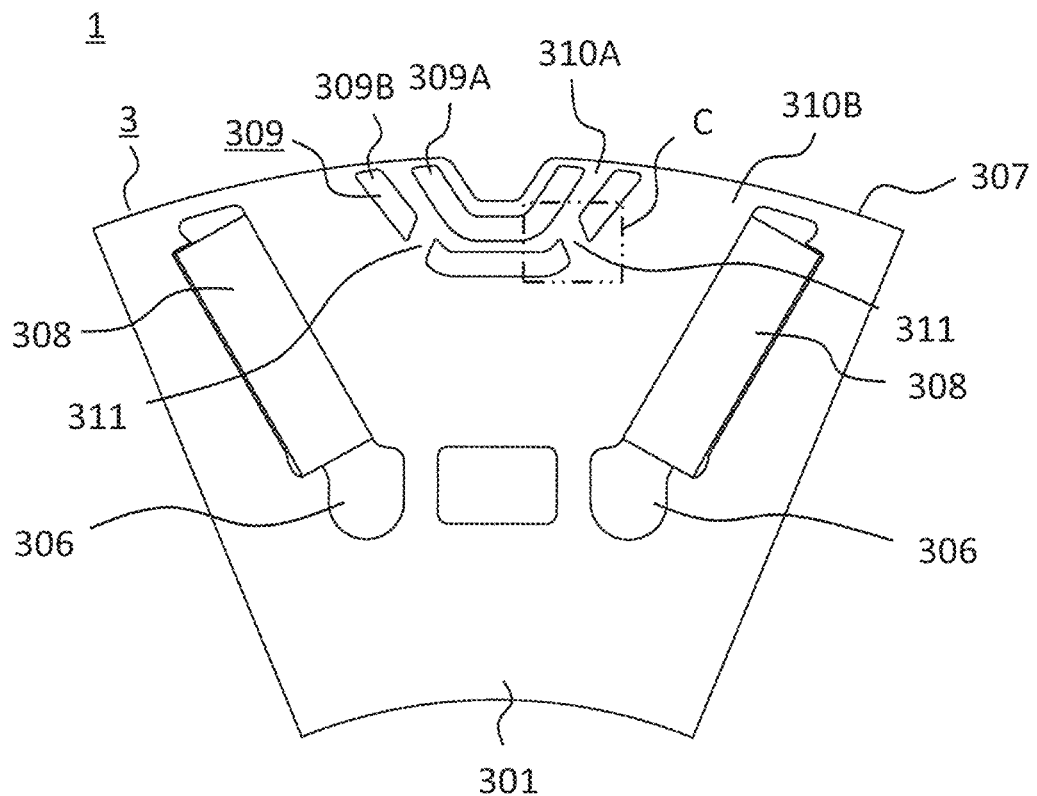
FIG. 25 is a plan view for illustrating a main portion of a stator in a second comparative example of the eighth embodiment.
Figure 26:
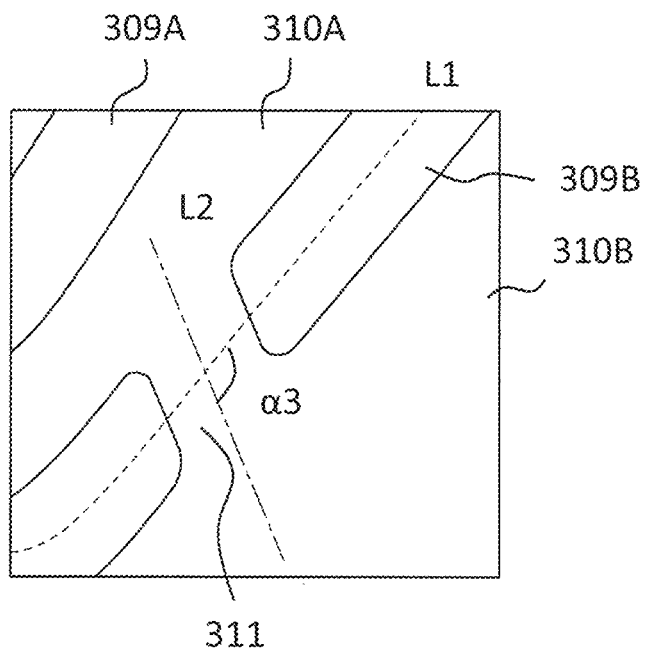
FIG. 26 is as enlarged view for illustrating a portion C of FIG. 25.

FIG. 25 is a plan view for illustrating a main portion of the rotor 3 in a second comparative example of the eighth embodiment. FIG. 26 is an enlarged view for illustrating a portion C of FIG. 25. An angle between the tangential line of the virtual center curved line L1 and the virtual center straight line L2 at the intersection point of the virtual center curved line L1 and the virtual center straight line L2 is set as $\alpha_3$. In the second comparative example, $\alpha_3 > 90$ [deg].

A direction of a centrifugal force acting on the rotor 3 is the radial direction. However, in the rotor core 301, the magnetic slit groups 305, the magnet insertion hole groups 303, and the cavities 304 are formed, and the permanent magnets 308 are inserted into the magnet insertion holes 306. Thus, a mass density of the rotor 3 becomes non-uniform. In this case, deformation of the rotor core 301 is not uniform. The centrifugal force acting on a portion of the rotor core 301 on the radially-outer side surface 307 side of the second magnetic slit 309B acts on the first magnet magnetic flux guide path 311.

In order to disperse the force acting on the first magnet magnetic flux guide path 311, it is conceivable to increase a widthwise dimension of the first magnet magnetic flux guide path 311. However, in this case, the d-axis inductance of the rotor 3 becomes larger. This reduces the salient pole ratio in the rotor 3.

It is conceivable that deformation in a direction perpendicular to the virtual center curved line L1 occurs in the first magnet magnetic flux guide path 311 due to the centrifugal force acting on a portion of the rotor core 301 that is farther apart from the permanent magnet group 302 than the second magnetic slit 309B is. Therefore, when the angle $\alpha_1$ between the tangential line of the virtual center curved line L1 and the virtual center straight line L2 at the intersection point of the virtual center curved line L1 and the virtual center straight line L2 is 90 [deg], the first magnet magnetic flux guide path 311 is inhibited from being bent.

Meanwhile, as illustrated in FIG. 24, when the angle $\alpha_2$ between the tangential line of the virtual center curved line L1 and the virtual center straight line L2 at the intersection point of the virtual center curved line L1 and the virtual center straight line L2 is smaller than 90 [deg], the first magnet magnetic flux guide path 311 is bent. In addition, as illustrated in FIG. 26, when the angle $\alpha_3$ between the tangential line of the virtual center curved line L1 and the virtual center straight line L2 at the intersection point of the virtual center curved line L1 and the virtual center straight line L2 is larger than 90 [deg], the first magnet magnetic flux guide path 311 is bent. The other configurations are the same as those of the first embodiment to the seventh embodiment.

As described above, in the rotating electric machine 1 according to the eighth embodiment, the angle $\alpha_1$ between the tangential line of the virtual center curved line L1 and the virtual center straight line L2 at the intersection point of the virtual center curved line L1 and the virtual center straight line L2 is 90 [deg]. Thus, the first magnet magnetic flux guide path 311 can be inhibited from being bent. As a result, it is possible to improve a centrifugal force resistance strength of the rotor 3.

REFERENCE SIGNS LIST 1 rotating electric machine, 2 stator, 3 rotor, 201 stator core, 202 coil, 203 core back, 204 tooth, 205 slot, 301 rotor core, 302 permanent magnet group, 303 magnet insertion hole group, 304 cavity, 305 magnetic slit group, 306 magnet insertion hole, 307 radially-outer side surface, 308 permanent magnet, 309 magnetic slit, 309A first magnetic slit, 309B second magnetic slit, 310A first q-axis magnetic path, 310B second q-axis magnetic path, 311 first magnet magnetic flux guide path, 312 recessed portion, 313 second magnet magnetic flux guide path

The invention claimed is:
1. A rotating electric machine, comprising:
a stator; and a rotor provided inside the stator in a radial direction of the stator;

wherein the rotor includes:

a rotor core having formed therein a magnet insertion hole group formed of a plurality of magnet insertion holes;

a permanent magnet group formed of a plurality of permanent magnets which are inserted into the magnet insertion hole group; and a magnetic slit group including a plurality of magnetic slits, wherein the plurality of magnet insertion holes forming the magnet insertion hole group are arranged side by side so that a shape of the magnet insertion hole group becomes a convex shape in which an intermediate portion protrudes from both end portions inwardly in a radial direction of the rotor core, wherein the plurality of permanent magnets forming the permanent magnet group form one magnetic pole in the rotor, wherein the rotor core has a first magnetic slit and a second magnetic slit formed in a portion of the rotor core surrounded by a radially-outer side surface of the rotor core and the magnet insertion hole group, the first magnetic slit being one of the plurality of magnetic slits included in the magnetic slit group and having an arc shape in which an intermediate portion protrudes from both end portions inwardly in the radial direction of the rotor core, the second magnetic slit being one of the plurality of magnetic slits included in the magnetic slit group, being provided closer to the magnet insertion hole group than the first magnetic slit, is provided, and having an arc shape in which an intermediate portion protrudes from both end portions inwardly in the radial direction of the rotor core;

wherein a portion of the rotor core between the first magnetic slit and the second magnetic slit is set as a first q-axis magnetic path, and a portion of the rotor core between the second magnetic slit and the magnet insertion hole group is set as a second q-axis magnetic path, wherein the second magnetic slit has arranged therein a first magnet magnetic flux guide path connecting the first q-axis magnetic path and the second q-axis magnetic path to each other, the first q-axis magnetic path being arranged along the radial direction of the rotor core so that the second magnetic slit is slit into a plurality of portions and the plurality of portions are space apart from each other, wherein the first magnetic slit provided on a radially-outer side of the first magnet magnetic flux guide path is a non-magnetic region, wherein one of two intersecting points at which a curved line passing through a widthwise center of the first q-axis magnetic path and the radially-outer side surface of the rotor core intersect is set as a first intersecting point, and the other of the two intersecting points is set as a second intersecting point, and wherein the rotating electric machine satisfies the following expression:

$\theta_1 = 2\pi \times n_1 \div \{P \times (2m_1 - 1)\}$ [rad], where:

$\theta_1$ represents an angle between a straight line passing through the first intersecting point and a radial center point of the rotor core and a straight line passing through the second intersecting point and the radial center point of the rotor core;

P represents the number of pole pairs;

$m_1$ represents a natural number; and $n_1$ represents a natural number smaller than $m_1$.

2. The rotating electric machine according to claim 1, wherein the first magnetic slit is formed continuously in a longitudinal direction of the first magnetic slit.

3. The rotating electric machine according to claim 1, wherein the number of magnetic slit groups is the same as the number of permanent magnet groups.

4. The rotating electric machine according to claim 1, wherein a magnet magnetic flux guided by a magnetic flux guide path passes only through a magnetic flux outlet of the rotating electric machine satisfying:

$\theta_1 = 2\pi \times n_1 \div \{P \times (2m_1 - 1)\}$ [rad], where $m_1$ represents 2, 3, or 4.

5. The rotating electric machine according to claim 1, wherein the stator includes:

a stator core; and a coil provided in the stator core, and wherein the rotating electric machine satisfies the following expression:

$\delta_s - \delta_r = \pi \times (2n_1 - 1)$ [rad], where:

$\delta_s$ represents a time phase difference between a $(2m_1-1)$th order time harmonic of magnetic flux and a $(2m_1+1)$th order time harmonic of magnetic flux that are generated by the coil to the interlinked with the stator core; and $\delta_r$ represents a space phase difference between a $(2m_1-1)$th order space harmonic of magnetic flux and a $(2m_1+1)$th order space harmonic of magnetic flux that are emitted from the permanent magnet and pass through the rotor core to be interlinked with the stator core.

6. The rotating electric machine according to claim 1, wherein the radially-outer side surface of the rotor core has recessed portions formed at two spots corresponding to the second q-axis magnetic path, respectively, wherein one of the recessed portions formed at the two spots is set as a first recessed portion, and the other of the recessed portions formed at the two spots is set as a second recessed portion, and wherein the rotating electric machine satisfies the following expression:

$\theta_2 = 2\pi \times n_2 \div \{P \times (2m_2 - 1)\}$ [rad], where:

$\theta_2$ represents an angle between a straight line passing through a widthwise center of the first recessed portion and a radial center point of the rotor core and a straight line passing through a widthwise center of the second recessed portion and the radial center point of the rotor core;

$m_2$ represents a natural number; and $n_2$ represents a natural number smaller than $m_2$.

7. The rotating electric machine according to claim 1, wherein radially-outer side portions of the first q-axis magnetic path and the second q-axis magnetic path are isolated from each other in terms of a circumferential direction of the rotor core.

8. The rotating electric machine according to claim 1, wherein an angle between a tangential line of a virtual center curved line and a virtual center straight line at an intersecting point at which the virtual center straight line and the virtual center curved line intersect is 90 degrees, the virtual center straight line being a straight line passing along the first magnet magnetic flux guide path through a center of the first magnet magnetic flux guide path, the virtual center curved line being a curved line passing along the second magnetic slit through a center of the second magnetic slit.

9. A rotating electric machine in which a rotor provided inside a stator in a radial direction of the stator is to be rotated, the rotating electric machine comprising:
- a pair of permanent magnets arranged in the rotor separately in a circumferential direction:
- a first magnetic slit which is provided inside the pair of permanent magnets in the circumferential direction, and has an arc shape in which an intermediate portion protrudes from both end portions inwardly in the radial direction; and
- a second magnetic slit which is provided inside the pair of permanent magnets in the circumferential direction and closer to the pair of permanent magnets side in the circumferential direction than the first magnetic slit is provided, and has an arc shape which is split into a plurality of portions and in which an intermediate portion protrudes from both end portions inwardly in the radial direction,
- wherein the first magnetic slit is formed of a non-magnetic region continuous in a longitudinal direction in a protruding portion protruding in an arc shape, and
- wherein the plurality of portions included in the second magnetic slit are arranged along a radial direction of the rotor core so as to be spaced apart from each other, and are arranged separately in the radial direction so as to be spaced apart from each other in a protruding portion which protrudes in the arc shape in the second magnetic slit, the protruding portion functioning as a magnet magnetic flux guide path.

* * * * *